United States Patent
Kim et al.

(10) Patent No.: US 12,243,291 B2
(45) Date of Patent: Mar. 4, 2025

(54) LOW-RESOLUTION IMAGING APPARATUS, ACTION RECOGNITION METHOD, ACTION RECOGNITION APPARATUS AND ACTION RECOGNITION SYSTEM

(71) Applicant: Korea Advanced Institute of Science and Technology, Daejeon (KR)

(72) Inventors: Song Min Kim, Daejeon (KR); Seung Woo Shim, Daejeon (KR); Hyeon Ho Shin, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 143 days.

(21) Appl. No.: 18/088,374

(22) Filed: Dec. 23, 2022

(65) Prior Publication Data
US 2024/0153244 A1 May 9, 2024

(30) Foreign Application Priority Data

Nov. 9, 2022 (KR) .......................... 10-2022-0148719
Dec. 14, 2022 (KR) .......................... 10-2022-0174609

(51) Int. Cl.
*G06V 10/77* (2022.01)
*G06V 10/62* (2022.01)
(Continued)

(52) U.S. Cl.
CPC .......... *G06V 10/7715* (2022.01); *G06V 10/62* (2022.01); *H04N 7/183* (2013.01);
(Continued)

(58) Field of Classification Search
CPC .. G06V 10/7715; G06V 10/62; G06V 10/774; H04N 7/183; H04N 23/65; H04N 23/72; H04N 23/73; H04N 23/741
See application file for complete search history.

(56) References Cited

U.S. PATENT DOCUMENTS

2008/0218611 A1* 9/2008 Parulski ............... H04N 23/741
348/262
2013/0324059 A1* 12/2013 Lee .................. H04W 52/0209
455/127.1
(Continued)

FOREIGN PATENT DOCUMENTS

KR      10-2306319 B1    9/2021
WO   WO 2022/133391 A1  6/2022

OTHER PUBLICATIONS

Korean Office Action for related KR Application No. 10-2022-0174609 mailed Dec. 31, 2023 from Korean Intellectual Property Office.
(Continued)

*Primary Examiner* — Ahmed A Berhan
(74) *Attorney, Agent, or Firm* — Paratus Law Group, PLLC

(57) ABSTRACT

There is provided a low-resolution imaging apparatus configured to form and transmit a low-resolution image of an object. The low-resolution imaging apparatus includes: a low-resolution camera configured to form the low-resolution image of the object; a microcontroller including an analog-to-digital convertor (ADC) that converts the low-resolution image into a digital image; an energy harvesting module configured to provide power to the low-resolution camera and the microcontroller; and a radio frequency identification (RFID) unit configured to transmit the digital-converted low-resolution image.

21 Claims, 20 Drawing Sheets

(51) Int. Cl.
*G06V 10/774* (2022.01)
*H04N 7/18* (2006.01)
*H04N 23/65* (2023.01)
*H04N 23/72* (2023.01)
*H04N 23/73* (2023.01)
*H04N 23/741* (2023.01)

(52) U.S. Cl.
CPC ............. *H04N 23/65* (2023.01); *H04N 23/72* (2023.01); *H04N 23/73* (2023.01); *H04N 23/741* (2023.01); *G06V 10/774* (2022.01)

(56) References Cited

U.S. PATENT DOCUMENTS

| | | | |
|---|---|---|---|
| 2016/0094255 A1* | 3/2016 | Meredith | H04M 11/007 455/132 |
| 2018/0278857 A1* | 9/2018 | Ohishi | G02B 5/201 |
| 2019/0051127 A1* | 2/2019 | Kanga | G08B 13/19658 |

OTHER PUBLICATIONS

Korean Office Action for related KR Application No. 10-2022-0178678 mailed Dec. 31, 2023 from Korean Intellectual Property Office.

* cited by examiner

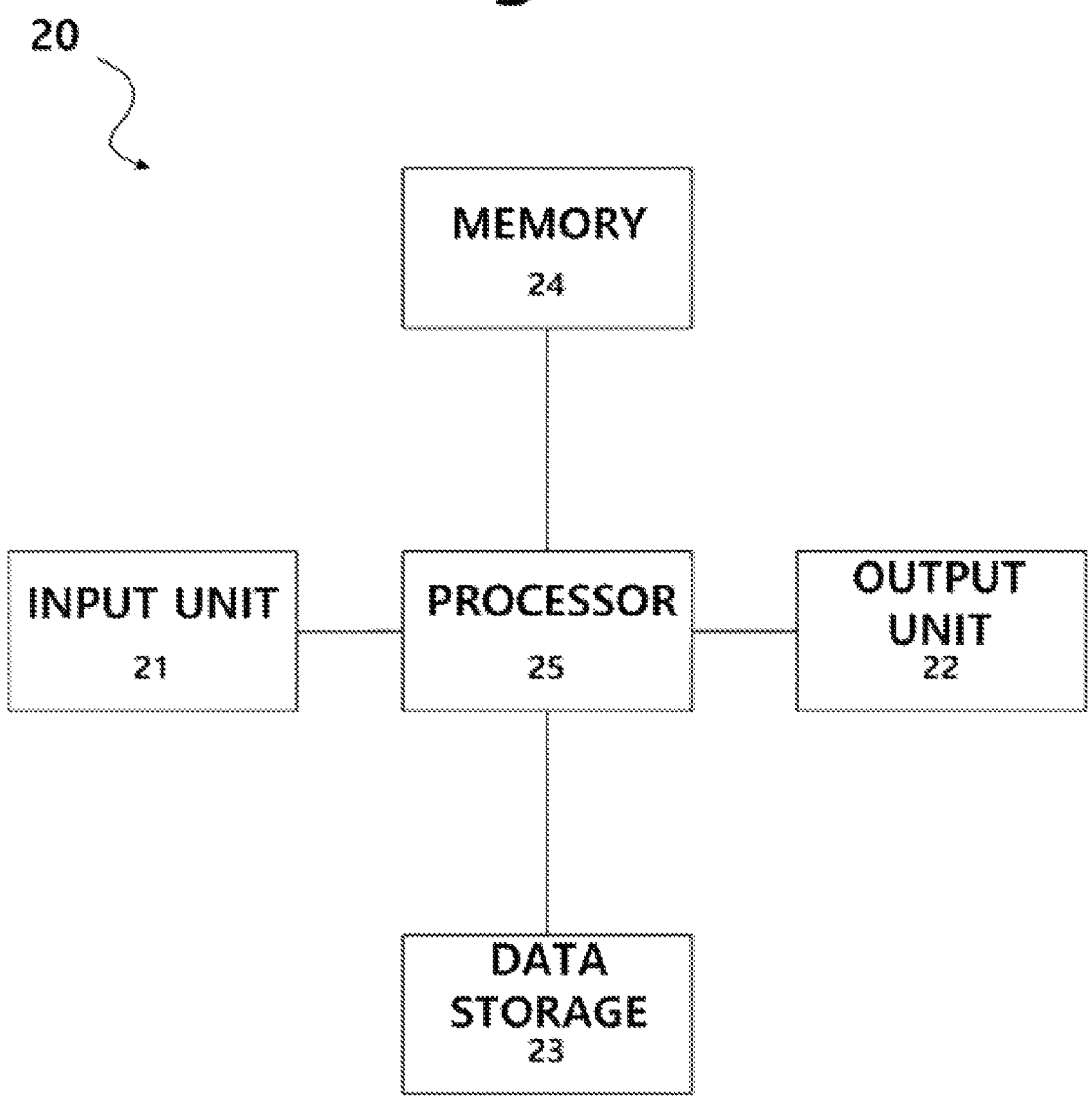

Fig. 11A

|  | clean up | sit down | stand up | exercise | drink | staggering | falling down | back pain | walk around | sneeze |
|---|---|---|---|---|---|---|---|---|---|---|
| clean up | 0.95 | 0.00 | 0.00 | 0.02 | 0.01 | 0.01 | 0.00 | 0.00 | 0.00 | 0.01 |
| sit down | 0.00 | 0.98 | 0.00 | 0.00 | 0.00 | 0.00 | 0.01 | 0.00 | 0.00 | 0.00 |
| stand up | 0.00 | 0.00 | 1.00 | 0.00 | 0.00 | 0.00 | 0.00 | 0.00 | 0.00 | 0.00 |
| exercise | 0.02 | 0.00 | 0.00 | 0.88 | 0.04 | 0.00 | 0.00 | 0.01 | 0.00 | 0.04 |
| drink | 0.00 | 0.00 | 0.00 | 0.02 | 0.89 | 0.00 | 0.00 | 0.04 | 0.00 | 0.05 |
| staggering | 0.02 | 0.00 | 0.00 | 0.01 | 0.00 | 0.93 | 0.01 | 0.00 | 0.03 | 0.01 |
| falling down | 0.00 | 0.01 | 0.00 | 0.00 | 0.00 | 0.02 | 0.97 | 0.00 | 0.00 | 0.00 |
| back pain | 0.00 | 0.00 | 0.00 | 0.01 | 0.09 | 0.00 | 0.00 | 0.87 | 0.00 | 0.03 |
| walk around | 0.00 | 0.00 | 0.00 | 0.00 | 0.00 | 0.01 | 0.00 | 0.00 | 0.98 | 0.00 |
| sneeze | 0.02 | 0.00 | 0.00 | 0.04 | 0.06 | 0.00 | 0.00 | 0.02 | 0.00 | 0.86 |

Fig. 11B

|              | clean up | sit down | stand up | exercise | drink | staggering | falling down | back pain | walk around | sneeze |
|---|---|---|---|---|---|---|---|---|---|---|
| clean up     | 0.83 | 0.01 | 0.01 | 0.04 | 0.02 | 0.02 | 0.02 | 0.01 | 0.01 | 0.04 |
| sit down     | 0.01 | 0.89 | 0.05 | 0.01 | 0.00 | 0.00 | 0.03 | 0.01 | 0.00 | 0.01 |
| stand up     | 0.01 | 0.03 | 0.92 | 0.00 | 0.01 | 0.00 | 0.00 | 0.01 | 0.00 | 0.01 |
| exercise     | 0.03 | 0.01 | 0.01 | 0.81 | 0.06 | 0.00 | 0.01 | 0.02 | 0.00 | 0.05 |
| drink        | 0.02 | 0.01 | 0.01 | 0.06 | 0.75 | 0.01 | 0.01 | 0.08 | 0.00 | 0.07 |
| staggering   | 0.01 | 0.00 | 0.00 | 0.00 | 0.00 | 0.94 | 0.00 | 0.00 | 0.04 | 0.00 |
| falling down | 0.03 | 0.02 | 0.00 | 0.00 | 0.01 | 0.01 | 0.90 | 0.01 | 0.01 | 0.00 |
| back pain    | 0.02 | 0.01 | 0.01 | 0.03 | 0.08 | 0.00 | 0.01 | 0.83 | 0.00 | 0.02 |
| walk around  | 0.00 | 0.00 | 0.00 | 0.00 | 0.00 | 0.02 | 0.01 | 0.00 | 0.97 | 0.00 |
| sneeze       | 0.03 | 0.01 | 0.00 | 0.06 | 0.06 | 0.00 | 0.00 | 0.03 | 0.00 | 0.79 |

Fig. 11C

|  | clean up | sit down | stand up | exercise | drink | staggering | falling down | back pain | walk around | sneeze |
|---|---|---|---|---|---|---|---|---|---|---|
| clean up | 0.97 | 0.01 | 0.00 | 0.01 | 0.01 | 0.01 | 0.00 | 0.00 | 0.00 | 0.01 |
| sit down | 0.00 | 1.00 | 0.00 | 0.00 | 0.00 | 0.00 | 0.00 | 0.00 | 0.00 | 0.00 |
| stand up | 0.00 | 0.00 | 0.99 | 0.00 | 0.00 | 0.00 | 0.01 | 0.00 | 0.00 | 0.00 |
| exercise | 0.01 | 0.00 | 0.00 | 0.96 | 0.02 | 0.00 | 0.00 | 0.01 | 0.00 | 0.02 |
| drink | 0.00 | 0.00 | 0.00 | 0.00 | 0.97 | 0.00 | 0.00 | 0.02 | 0.00 | 0.02 |
| staggering | 0.00 | 0.00 | 0.00 | 0.01 | 0.00 | 0.99 | 0.00 | 0.00 | 0.00 | 0.01 |
| falling down | 0.00 | 0.00 | 0.00 | 0.00 | 0.00 | 0.01 | 0.99 | 0.00 | 0.00 | 0.00 |
| back pain | 0.00 | 0.00 | 0.00 | 0.01 | 0.03 | 0.00 | 0.00 | 0.97 | 0.00 | 0.00 |
| walk around | 0.00 | 0.00 | 0.00 | 0.00 | 0.00 | 0.00 | 0.00 | 0.00 | 1.00 | 0.00 |
| sneeze | 0.00 | 0.00 | 0.00 | 0.01 | 0.03 | 0.00 | 0.00 | 0.00 | 0.00 | 0.96 |

Fig. 17B

|  | clean up | sit down | stand up | exercise | drink | staggering | falling down | back pain | walk around | sneeze |
|---|---|---|---|---|---|---|---|---|---|---|
| clean up | 0.82 | 0.00 | 0.00 | 0.04 | 0.04 | 0.00 | 0.00 | 0.07 | 0.01 | 0.04 |
| sit down | 0.00 | 0.92 | 0.01 | 0.00 | 0.00 | 0.00 | 0.04 | 0.04 | 0.00 | 0.01 |
| stand up | 0.01 | 0.01 | 0.96 | 0.00 | 0.00 | 0.00 | 0.01 | 0.01 | 0.00 | 0.00 |
| exercise | 0.20 | 0.00 | 0.00 | 0.66 | 0.03 | 0.00 | 0.00 | 0.02 | 0.00 | 0.10 |
| drink | 0.00 | 0.00 | 0.00 | 0.00 | 0.84 | 0.00 | 0.01 | 0.13 | 0.00 | 0.01 |
| staggering | 0.04 | 0.00 | 0.00 | 0.06 | 0.01 | 0.78 | 0.04 | 0.00 | 0.08 | 0.01 |
| falling down | 0.01 | 0.00 | 0.01 | 0.00 | 0.00 | 0.00 | 0.99 | 0.00 | 0.00 | 0.00 |
| back pain | 0.00 | 0.00 | 0.00 | 0.01 | 0.01 | 0.00 | 0.00 | 0.97 | 0.00 | 0.01 |
| walk around | 0.01 | 0.01 | 0.00 | 0.01 | 0.00 | 0.01 | 0.01 | 0.00 | 0.96 | 0.01 |
| sneeze | 0.01 | 0.00 | 0.00 | 0.06 | 0.04 | 0.00 | 0.00 | 0.01 | 0.01 | 0.87 |

LOW-RESOLUTION IMAGING APPARATUS, ACTION RECOGNITION METHOD, ACTION RECOGNITION APPARATUS AND ACTION RECOGNITION SYSTEM

CROSS-REFERENCE TO RELATED APPLICATIONS

This application claims priority to Korean Patent Application Nos. 10-2022-0148719 (filed on Nov. 9, 2022) and 10-2022-0174609 (filed on Dec. 14, 2022), which are hereby incorporated by reference in their entirety.

BACKGROUND

The present disclosure generally relates to a low-resolution imaging apparatus, an action recognition method, an action recognition apparatus, and an action recognition system.

Due to the remarkable development of computer vision, a huge amount of services distributed across various sectors for routine use from public and commercial infrastructure to military surveillance have been introduced. Vision-based personalized services, such as emergency and medical (e.g., fall detection) services, are very beneficial and important, but serious concerns about invasion of privacy impede the widespread proliferation of computer vision systems in private spaces such as bedrooms.

In order to suggest various image processing techniques that anonymize images and videos locally before uploading to the cloud, there has been considerable effort toward a vision of private information protection in academia and industry. This includes blurring, pixelation, overwriting sensitive pixels with other images, or the like. Nevertheless, such techniques cannot be accessed by a user and thus fidelity is not guaranteed. In addition, recent incidents of hacking IoT cameras indicate that local processing may be vulnerable to leakage of personal information. Deploying vision systems in private spaces involves complex and occluded environments (with many small-sized rooms) compared to public areas (mostly open spaces) where cameras must be widely deployed to avoid blind spots to other obstacles.

SUMMARY

The present technology is designed to solve the problems of the related art. The present disclosure is directed to providing an action recognition system using a low-resolution video to prevent the leakage of privacy. That is, the present disclosure is directed to providing a technology capable of ensuring safety from hacking and other misuses of data by fundamentally preventing the leakage of privacy in a detection stage.

Furthermore, the present disclosure is also directed to providing an action recognition apparatus capable of operating without a battery by reducing power consumption and recognizing an action with high accuracy even in low illuminance.

A low-resolution imaging apparatus of the present embodiment includes a low-resolution camera configured to form a low-resolution image of an object, a microcontroller configured to calibrate the image, an energy harvesting module configured to provide power to the low-resolution camera and the microcontroller, and a radio frequency identification (RFID) unit configured to transmit the calibrated low-resolution image.

According to one aspect of the present embodiment, the low-resolution image may be a gray-scale image having a frame rate of 10 frames per second or less, and may have a resolution in which a spatial feature of the object is not visually distinguished.

According to one aspect of the present embodiment, the microcontroller may control the energy harvesting module and the low-resolution camera.

According to one aspect of the present embodiment, the low-resolution camera may capture an image of the object with invisible light and form the low-resolution image.

According to one aspect of the present embodiment, the microcontroller may extract pixel values of pixels at the same position in two consecutive frames of the image formed by the low-resolution camera, and calibrate the image by adjusting the exposure of the pixels in which a difference between the extracted pixel values is greater than a threshold.

According to one aspect of the present embodiment, the microcontroller may include the ADC, and the microcontroller may calculate an average of the pixel values extracted from the two consecutive frames, and further adjust the pixel values so that the calculated average of the pixel values corresponds to an input dynamic range of the ADC.

According to one aspect of the present embodiment, the RFID unit may include an RFID circuit, an antenna configured to transmit the calibrated low-resolution image, and an RF energy harvesting unit, and the RFID unit is driven by power collected by the RF energy harvesting unit.

According to one aspect of the present embodiment, the RFID circuit may perform sub-carrier modulation using a Miller 8 modulation method.

An action recognition method of the present embodiment includes a pre-processing operation of obtaining a feature map according to a time of each pixel included in a low-resolution image of a plurality of frames of an object from the input low-resolution image, and an inference operation of inferring a target action of the object from the feature map, wherein the inference operation is performed by extracting a temporal feature of the target action and forming an emphasized feature map according to the extracted temporal feature.

According to one aspect of the present embodiment, the input low-resolution image may have a frame rate of 10 frames per second or less and a resolution in which a spatial feature of the object is not visually distinguished.

According to one aspect of the present embodiment, in the pre-processing operation, the feature map corresponding to the temporal feature may be formed from the input low-resolution image of the plurality of frames of the object.

According to one aspect of the present embodiment, the pre-processing operation may be performed by performing a convolution calculation using a time corresponding to the number of frames and a kernel formed in a number smaller than the number of pixels included in the frame.

According to one aspect of the present embodiment, the inference operation may include a unit calculation operation including a convolution calculation operation, an attention calculation operation, and a pooling operation, wherein the attention calculation operation may include extracting the temporal feature of the target action from an input feature map (FM), and forming an emphasized feature map (EFM) according to the extracted temporal feature.

According to one aspect of the present embodiment, the inference operation may include a plurality of unit calculation operations that are continuously performed, and as the plurality of unit calculation operations are continuously performed, a feature map in which the temporal feature is further emphasized as compared to the emphasized feature map output from the previous operation may be output.

According to one aspect of the present embodiment, the extracting of the temporal feature of the target action may include performing average pooling on the input feature map, performing max pooling on the input feature map, summing results obtained by performing the average pooling and the max pooling, and forming an attention map corresponding to the temporal feature of the target action by using the summed result.

According to one aspect of the present embodiment, the forming of the emphasized feature map according to the extracted temporal feature may be performed by calculating an element-to-element multiplication of the input feature map and the attention map.

According to one aspect of the present embodiment, in the action recognition method, each of a clean-up action, a sit-down action, a stand-up action, an exercise action, a drink action, staggering, falling down, back pain, a walkaround action, a sneeze action, and other actions of the object may be distinguished.

An action recognition apparatus of the present embodiment configured to recognize an action of an object includes one or more processors, and a memory configured to store one or more instructions executed by the processor, wherein the instructions, when executed by the one or more processors, cause the one or more processors to perform an action recognition method including a pre-processing operation of obtaining a feature map according to a time of each pixel included in a low-resolution image of a plurality of frames of an object from the input low-resolution image, and an inference operation of inferring a target action of the object from the feature map, wherein the inference operation is performed by extracting a temporal feature of the target action and forming an emphasized feature map according to the extracted temporal feature.

An action recognition system of the present embodiment includes a low-resolution imaging apparatus including a low-resolution camera configured to form a low-resolution image of an object and configured to transmit the low-resolution image, and an action recognition apparatus configured to perform an action recognition method of obtaining a feature map according to a time of each pixel included in the image from the low-resolution image transmitted by the low-resolution imaging apparatus, and inferring an action of the object from the feature map to identify the action of the object, wherein the low-resolution image has a resolution in which a spatial feature of the object is not visually distinguished.

According to the present embodiment, there is an advantage of being able to detect an action with high accuracy while fundamentally preventing the leakage of personal privacy. Furthermore, there is an advantage of being able to operate without a battery and to recognize an action with high accuracy even in low illuminance.

BRIEF DESCRIPTION OF THE DRAWINGS

FIG. 9 is a diagram illustrating an overview of an action recognition apparatus configured to perform action recognition according to the present embodiment.

FIGS. 11A and 11B are diagrams illustrating performance obtained in different fields of view using the single low-resolution imaging apparatus in each of positions A and B, in the form of a confusion matrix, and FIG. 11C is a diagram illustrating classification results, which are obtained from both positions A and B, in the form of a confusion matrix.

FIG. 17B is a diagram illustrating an accuracy of action classification using the present embodiment, which is not trained in the new lighting condition environment.

DETAILED DESCRIPTION

Figure 1:
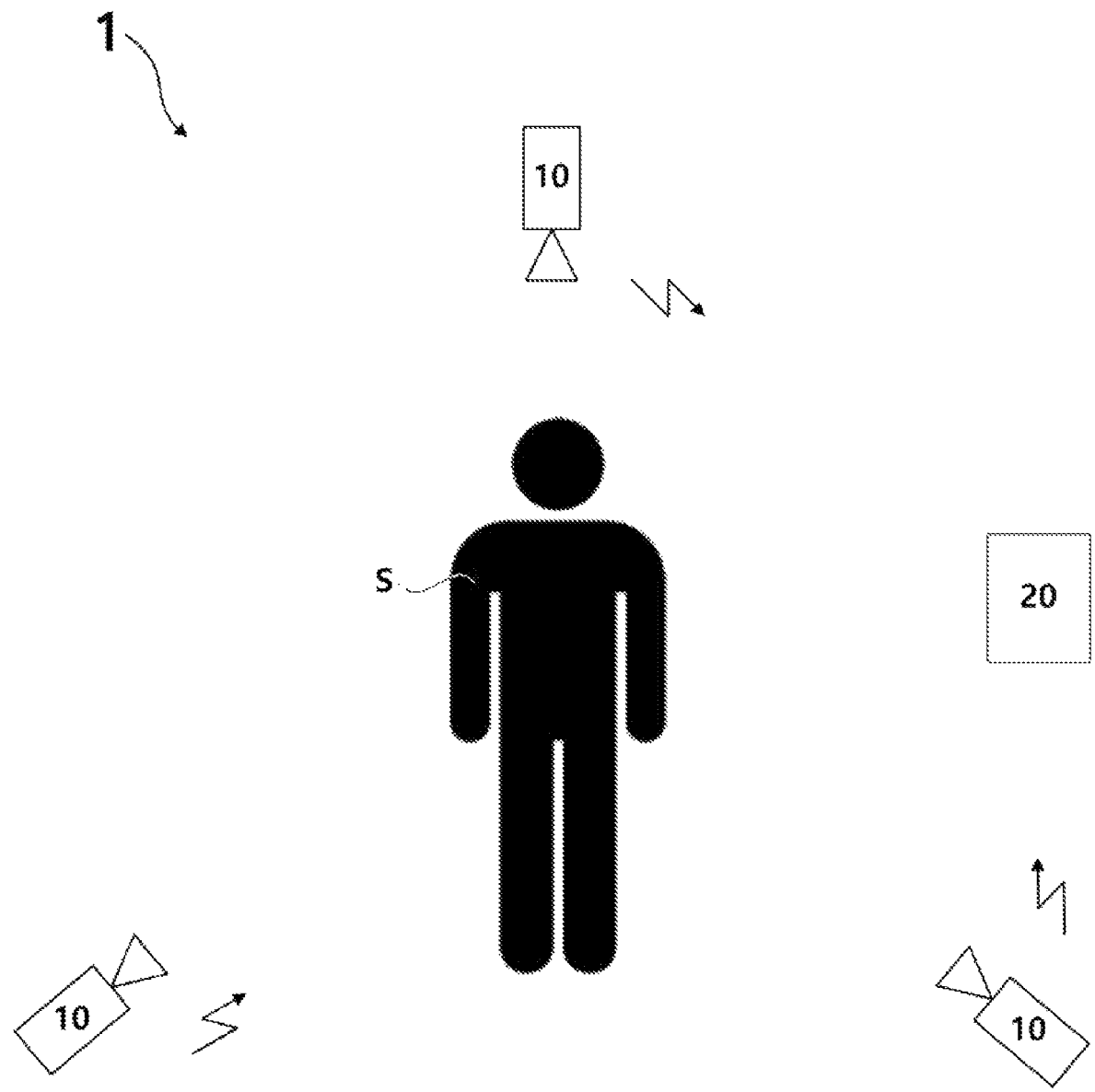
FIG. 1 is a block diagram illustrating an overview of an action recognition system according to the present embodiment.

Hereinafter, the present embodiment will be described with reference to the accompanying drawings. FIG. 1 is a block diagram illustrating an overview of an action recognition system 1 according to the present embodiment. Referring to FIG. 1, the action recognition system 1 according to the present embodiment includes a low-resolution imaging apparatus 10 including a low-resolution camera configured to form a low-resolution image of an object S and transmit the low-resolution image, and an action recognition apparatus 20 configured to perform an action recognition method in which an action of the object is identified from the low-resolution image transmitted by the low-resolution imaging apparatus, and the action recognition method includes obtaining a feature map according to a time of each pixel included in the image from the low-resolution image, and inferring the action of the object from the feature map.

Figure 2:
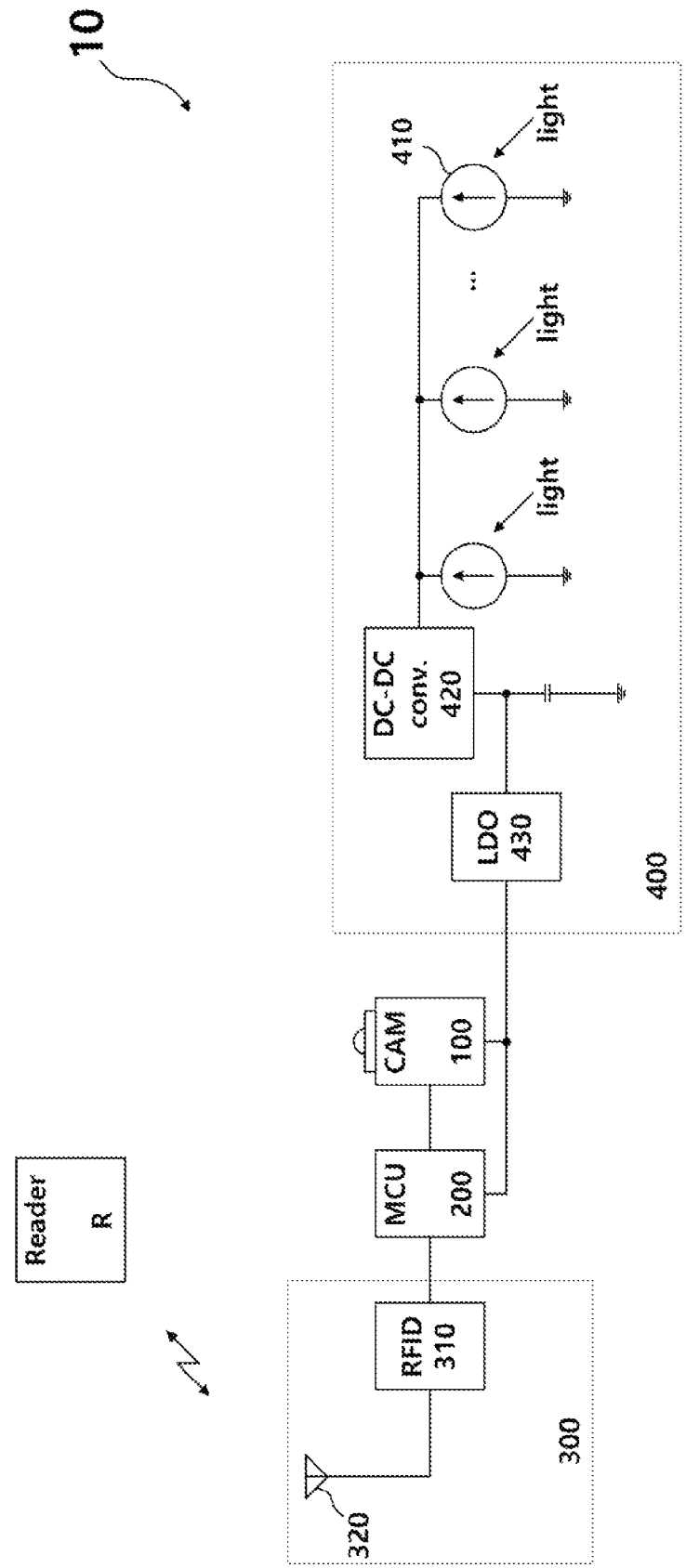
FIG. 2 is a block diagram illustrating an overview of a low-resolution imaging apparatus according to the present embodiment.

FIG. 2 is a block diagram illustrating an overview of the low-resolution imaging apparatus according to the present embodiment. Referring to FIG. 2, the low-resolution imaging apparatus includes a low-resolution camera (CAM) 100 configured to form a low-resolution image of an object, a microcontroller (MCU) 200 including an analog to digital convertor (ADC) that converts the low-resolution image into digital, an energy harvesting unit 400 configured to provide power to the low-resolution camera 100 and the microcontroller 200, and a radio frequency identification (RFID) unit 300 configured to transmit the calibrated low-resolution image. In one embodiment, the microcontroller 200 may include an ADC that converts an analog signal into a digital code.

The low-resolution camera 100 forms the low-resolution image of the object with invisible light. In one embodiment, the invisible light may be any one of infrared light, ultraviolet light, an electromagnetic wave having a wavelength shorter than the ultraviolet light. As an example, the infrared light may be near-infrared light.

Figure 3A:
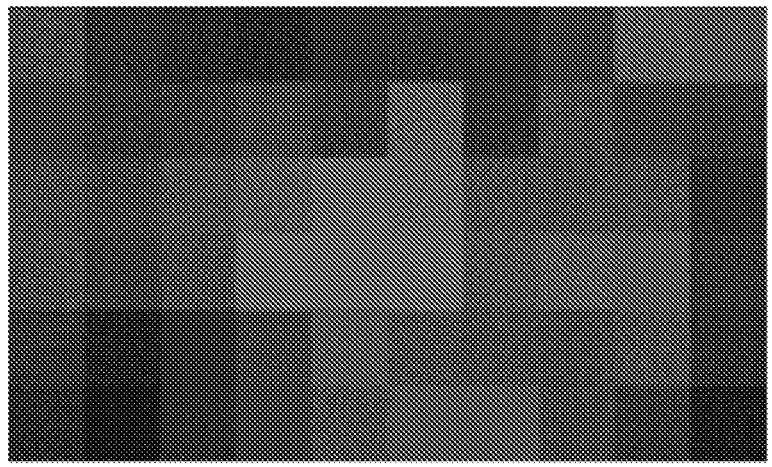
FIG. 3A is a diagram schematically illustrating an image formed by a low-resolution camera.
Figure 3B:
FIG. 3B is an image obtained by capturing the object the same as that in FIG. 3A with high resolution.
Figure 3C:
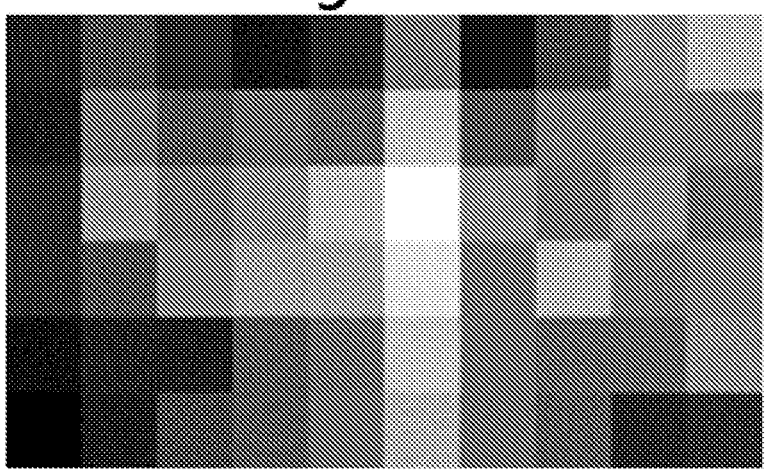
FIG. 3C is an image obtained by calibrating the low-resolution image of FIG. 3A.

FIG. 3A is a diagram schematically illustrating an image formed by the low-resolution camera 100, FIG. 3B is an image obtained by capturing the object the same as that in FIG. 3A with high resolution, and FIG. 3C is an image obtained by calibrating the low-resolution image of FIG. 3A. The low-resolution camera 100 captures an image of an object and forms a low-resolution image similar to that illustrated in FIG. 3A.

Referring to FIGS. 3A and 3B, in the embodiment, a low-resolution image formed by capturing an object by the low-resolution camera 100 may be a gray-scale image. As an example, the low-resolution image formed by the low-resolution camera 100 may have 6*10 pixels, and each pixel may have a pixel depth of 13 bits. Thus, 780 bits (=97.5 bytes) are requested to transmit one frame, and with such a small data size, when the RFID unit 300 transmits data, high power efficiency can be achieved as will be described below. Furthermore, as will be described below, a plurality of low-resolution imaging apparatuses 10 may be utilized to identify a movement of the object with high accuracy.

The low-resolution image formed by capturing the object by the low-resolution camera 100 has a resolution in which a spatial feature of the object is not distinguished. In the illustrated example, the low-resolution image has a resolution of 6*10 pixels, but this is merely an example, and the low-resolution image may have a higher or lower resolution. However, the low-resolution image is sufficient if it has a resolution at which the spatial feature of the object, such as shape, curvature, or texture, is visually indistinguishable.

A center portion of the low-resolution image formed by capturing the object by the low-resolution camera 100 illustrated in FIG. 3A only includes a relatively brighter portion than the periphery thereof, and the curvature, shape, and texture of the object cannot be identified due to low resolution. In the present embodiment, the low-resolution image is captured to identify a movement of the object, so that the problem in which the image is leaked and thus personal privacy is invaded may be fundamentally prevented.

Referring to FIG. 2 again, in one embodiment, the low-resolution camera 100 captures an image of an object at a frame rate of several frames per second and provides the image to the microcontroller 200. In one embodiment, the low-resolution camera 100 may capture an image at a frame rate of one of 1 to 10 frames per second. The higher a frame rate, the higher object action recognition performance, but power consumption of the low-resolution imaging apparatus 10 increases. Hereinafter, a case in which the low-resolution camera 100 captures an image at a frame rate of 2 frames per second is exemplified. However, this is for the purpose of description and is not intended to limit the scope of the present disclosure.

In the image (see FIG. 3A) captured by the low-resolution camera 100, pixel values of pixels constituting the low-resolution image vary greatly depending on a lighting environment in which the object is located, and thus accuracy may be slightly reduced when identifying an action with the corresponding image.

In one embodiment, the microcontroller 200 receives the image captured by the low-resolution camera 100 and forms a digitized image and provides the digitized image to the RFID unit 300. The RFID unit 300 provides the digitized image to an external apparatus such as a reader R. The reader R receives the low-resolution image and calculates a set value such as an aperture value of the low-resolution camera 100 so that an average value of the pixels constituting the low-resolution image matches a median of the ADC of the microcontroller 200, and provides the calculated value to the low-resolution imaging apparatus 10.

The microcontroller 200 controls the low-resolution camera 100 using the set value provided by the reader R, and the low-resolution camera 100 forms an image corresponding to a dynamic range of the ADC of the microcontroller 200.

In another embodiment, the microcontroller 200 receives the image captured by the low-resolution camera 100 and sets an aperture value or the like of the low-resolution camera 100 so that the image provided by the low-resolution camera 100 matches the dynamic range of the ADC.

In the above-described embodiments, the reader R or the microcontroller 200 calculates a difference between pixel values of pixels at the same position in two consecutive frames, and adjusts exposure for the pixels where the difference between the calculated pixel values is greater than a threshold value. In one embodiment, the threshold value may be the magnitude of noise of a sensor included in the low-resolution camera 100. Accordingly, the reader R or the microcontroller 200 adjusts the exposure for the pixels whose pixel values change more than the magnitude of the noise.

In addition, a static background has little influence on recognizing the action of the object. When the process of adjusting a pixel value is performed even on the static background, power consumption of the low-resolution imaging apparatus 10 is increased, and thus pixel value adjustment may not be performed for the pixels forming a static background to reduce the power consumption.

The reader R or the microcontroller 200 calculates an average value of the pixel values, which are calculated as described above, when adjusting the exposure, and adjusts the exposure such that the calculated average value matches a median of an input dynamic range of the ADC included in the microcontroller 200. The low-resolution image illustrated in FIG. 3A is input to the microcontroller 200. The microcontroller 200 calibrates the input image to form and output the low-resolution image illustrated in FIG. 3C. The illustrated exposure adjustment is useful when the low-resolution imaging apparatus 10 is disposed in a low-illuminance environment.

The energy harvesting unit 400 collects energy in an environment in which the low-resolution imaging apparatus 10 is disposed, and provides driving power to the low-resolution camera 100 and the microcontroller 200 using the collected energy. In another embodiment, the energy harvesting unit 400 may additionally provide the driving power to the RFID unit 300. In one embodiment, the energy harvesting unit 400 may include a plurality of photovoltaic devices 410 that collect light energy and convert the light energy into power. In another embodiment, the energy harvesting unit may collect power of radio waves in an environment in which the energy harvesting unit is disposed.

In the embodiment illustrated in FIG. 2, the plurality of photovoltaic devices 410 may be connected in parallel. Light is provided to the photovoltaic device 410 and the photovoltaic device 410 outputs a current. In a state in which the plurality of photovoltaic devices 410 are connected in series, some photovoltaic devices 410 may be provided with light to output a current, and some other photovoltaic devices 410 may be shaded. An equivalent resistance value of the shaded photovoltaic device is greater than those of the other photovoltaic devices, and thus power generation efficiency of the energy harvesting unit 400 is reduced. In order to prevent the efficiency reduction, the plurality of photovoltaic devices 410 are connected in parallel.

The power formed by the photovoltaic devices 410 may be provided to a DC-DC converter 420 to be stepped up or down in voltage. As an example, the DC-DC converter 420 may be a boost converter, and may output the power formed by the photovoltaic devices 410 by stepping up a voltage of the power. As another example, the DC-DC converter 420 is a buck converter, and may output the power formed by the photovoltaic devices 410 by stepping down the voltage of the power.

The power output by the DC-DC converter 420 may be provided to a regulator 430 and adjusted, and the regulator 430 outputs the adjusted power to the low-resolution camera 100 and the microcontroller 200. As in the illustrated embodiment, the regulator 430 may be a low drop-out (LDO) regulator.

The low-resolution image digitized by the microcontroller 200 is provided to the RFID unit 300 and transmitted to the reader R. In one embodiment, the reader R may be included in the action recognition apparatus 20 to provide the received low-resolution image, or may provide the received low-resolution image to the action recognition apparatus 20 via a communication device (not shown).

The RFID unit 300 includes an RFID circuit 310, an antenna 320, and an RF energy harvesting unit (not shown). In one embodiment, the RFID unit 300 may be driven by energy collected by the RF energy harvesting unit. In another embodiment, the RFID unit 300 may be driven by the power collected and provided by the energy harvesting unit 400. In one embodiment, the RF energy harvesting unit may collect energy from radio waves of an RF band by using the antenna 320 included in the RFID unit 300, and collect power to drive itself.

Figure 4:
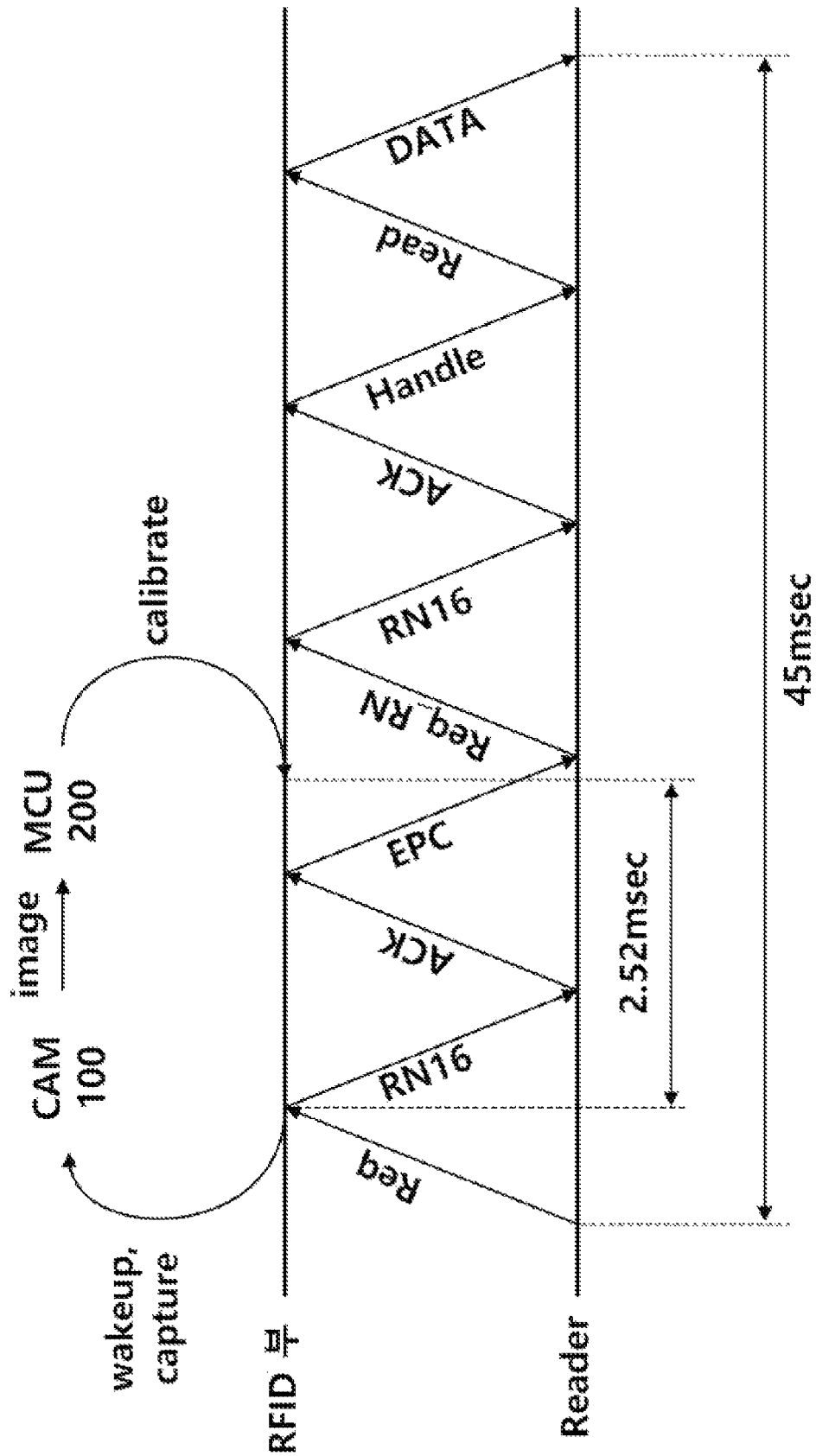
FIG. 4 is a diagram schematically illustrating a communication process between a radio frequency identification (RFID) unit and a reader.

FIG. 4 is a diagram schematically illustrating a communication process between the RFID unit 300 and the reader R. The communication process between the RFID unit 300 and the reader R may be performed as illustrated in FIG. 4. The reader R initiates communication by outputting a request signal Req. The RFID unit 300, which has received the request signal Req, wakes up the low-resolution camera 100 in a sleep state. In addition, the RFID unit 300 receives the request signal Req and provides a capture command to the low-resolution camera 100 so that the low-resolution camera 100 captures an image of the object.

When the low-resolution imaging apparatus 10 including the low-resolution camera 100 and the microcontroller 200 is in a sleep state, the low-resolution imaging apparatus 10 is woken up by a change in received signal strength intensity (RSSI). The RSSI indicates a relative strength of the received signal, and a value thereof varies with a channel change (e.g., an obstacle in a field of view of the RFID antenna with respect to the low-resolution imaging apparatus).

An RSSI variance may be observed through this, thereby detecting a movement in the periphery of the low-resolution imaging apparatus. That is, when the RSSI variance is measured to be greater than an RSSI threshold, the low-resolution imaging apparatus is switched to a detection state. The RSSI threshold is analytically set to 0.93, which is 25% higher than the maximum RSSI variance (=0.74), when there is no movement. When the plurality of low-resolution imaging apparatuses 10 are disposed, all the low-resolution imaging apparatuses are woken up whenever any one low-resolution imaging apparatus detects a movement.

The RFID unit 300 transmits a 16-bit random number RN16 to the reader R in response to the request signal Req. The RFID unit 300 receives an acknowledgement ACK from the reader R and then transmits a unique Electronic Product Code (EPC) code EPC.

The reader R transmits a command Req_RN to request the 16-bit random number from the RFID unit 300. When the RFID unit 300 provides the 16-bit random number RN16 in response to the command Req_RN, the reader R transmits the acknowledgement ACK. The RFID unit 300 transmits "Handle," and when the reader R receives the "Handle," the reader R transmits a read request Read to the RFID unit 300. The RFID unit 300 transmits a low-resolution image, which is data DATA, in response to the read request Read, and when the reader R receives the data provided by the RFID unit 300, the data transmission is completed.

A time, for which the low-resolution camera 100 captures an object, forms the image, and samples the image, may be longer than a length of a response period for the read request Read of the reader R. As an example, the length of the response period for the read request Read may be several hundred microseconds (pec), but the time for capturing an object and forming and sampling the image by the low-resolution camera 100 may take several milliseconds (msec).

In the present embodiment, the request signal Req from the reader R is used as a signal for waking up the low-resolution camera 100 and the microcontroller 200 in a sleep state, and the low-resolution camera 100 receiving the request signal Req may capture an image of an object by using the request signal Req as a capture command.

Furthermore, the maximum size of data that the RFID unit 300 may transmit to the reader R side in a detection phase P2 is 128 bytes. The data size is sufficient to transmit images formed by the low-resolution camera 100. Accordingly, low-resolution images formed by the low-resolution camera may be streamed and transmitted to the reader R in real time.

In one embodiment, the RFID unit 300 performs sub-carrier modulation using a Miller 8 modulation method. The Miller 8 modulation is used to cause a time from an identification in the RFID unit 300 to a response in the RFID unit 300 to exceed 2.52 msec. In addition, by using the Miller 8 modulation, it takes 45 msec to transmit an image of 6*10 pixels having a 13-bit depth as shown in the drawing. Accordingly, according to the present embodiment, approximately 22 images may be transmitted per one second, and up to 11 RFID units 300 may be supported to stream images at two frames per second.

Figure 5:
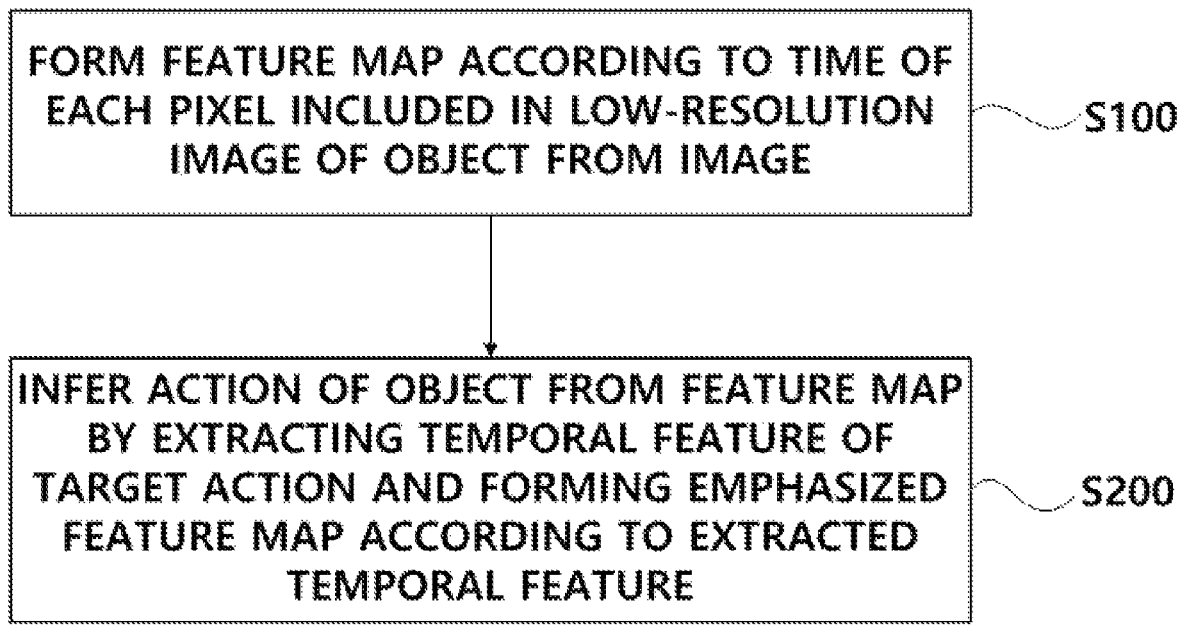
FIG. 5 is a flowchart illustrating an overview of an action recognition method according to the present embodiment.

Hereinafter, an action recognition method according to the present embodiment will be described with reference to FIGS. 5 to 8. FIG. 5 is a flowchart illustrating an overview of the action recognition method according to the present embodiment. Referring to FIG. 5, the action recognition method according to the present embodiment includes pre-processing operation (S100) of forming a feature map according to a time of each pixel included in a low-resolution image of an object from the input image, and inference operation (S200) of inferring an action of the object from the feature map, and the inference operation includes extracting a temporal feature of a target action and forming an emphasized feature map according to the extracted temporal feature.

Figure 6A:
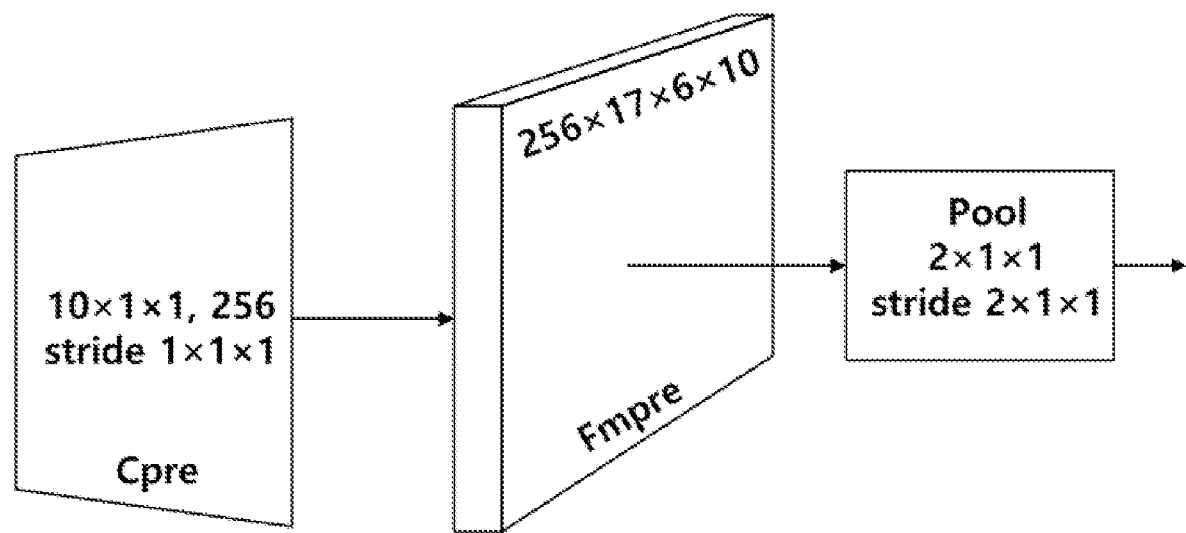
FIG. 6A is a block diagram illustrating each performing process of a pre-processing operation of the present embodiment as a block.
Figure 6B:
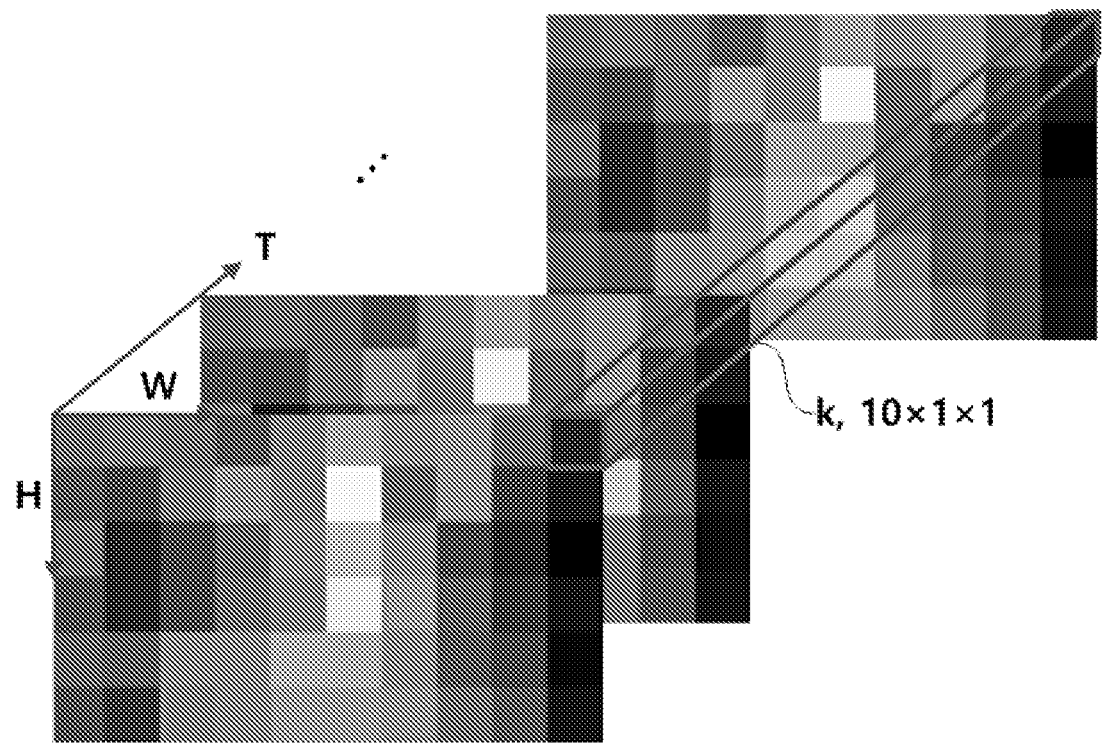
FIG. 6B is a diagram schematically illustrating a kernel in the pre-processing operation of the present embodiment.

FIG. 6A is a block diagram illustrating each performing process of pre-processing operation (S100) of the present embodiment as a block, and FIG. 6B is a diagram schematically illustrating a kernel in pre-processing operation (S100) of the present embodiment. In FIGS. 6A and 6B, a convolution layer Cpre is illustrated in the form of "T×H×W, C," (where T: image frame, H: height, W: width, and C: channel) and a stride is illustrated in the form of "T×H×W."

Referring to FIGS. 6A and 6B, in pre-processing operation (S100), a feature map FMpre according to a time is formed for each pixel included in a plurality of frames streamed and provided. As in the embodiment illustrated in FIG. 6B, the feature map is formed by performing a convolution calculation with a 1×1 kernel k on a plurality of consecutive frames. In the illustrated embodiment, it is illustrated that 10 consecutive frames are used, but 10 or more consecutive frames may be used, so that an accuracy of distinguishing between an action performed for a short time and an action performed for a long time may be improved. In the illustrated embodiment, the convolution calculation is performed with a 10 consecutive frames×1×1 kernel and 256 channels, and may be performed by striding the kernel in units of 1×1×1.

In addition, in the illustrated embodiment, a case in which the calculation is performed using a 10×1×1 kernel is illustrated, but the calculation may be performed using a 10×k×n kernel (where k: a natural number closest to (a row number of the low-resolution image)/3, and n: a natural number closest to (a column number/the low-resolution image)/3). Pooling is performed on the feature map. In one embodiment, the pooling may be max pooling and may be performed by performing a stride in units of a 2×1×1 (T×H×W). Pre-processing operation (S100) is performed at different speeds and different durations, which is advantageous in that a temporal feature of an action whose feature varies over time may be detected with high accuracy.

Figure 7:
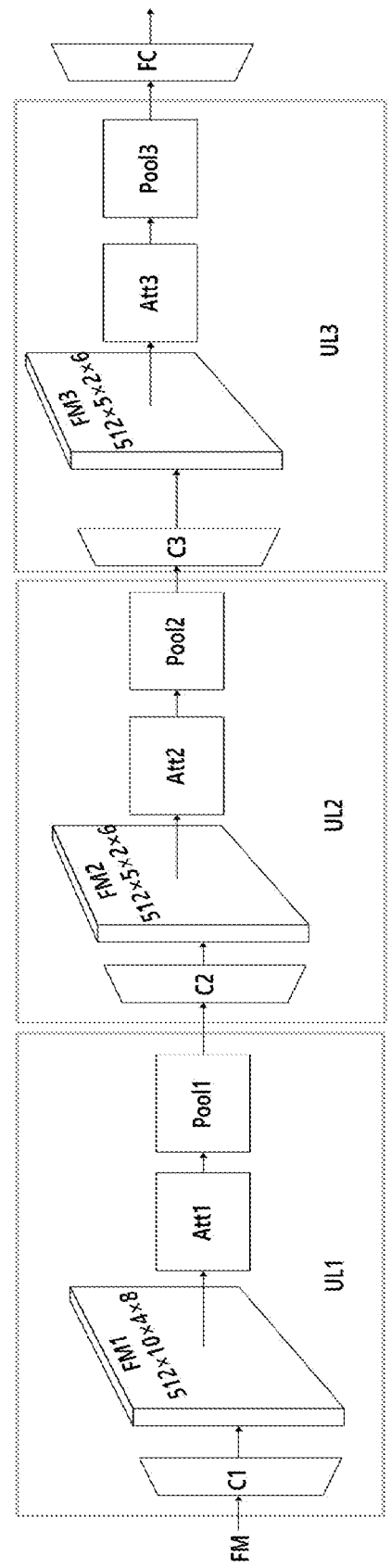
FIG. 7 is a block diagram illustrating each performing process of an inference operation as a block.

FIG. 7 is a block diagram illustrating each performing process of inference operation (S200) as a block. Referring to FIG. 7, inference operation (S200) may include a plurality of unit calculation processes, and the unit calculation processes are illustrated as unit layers UL1, UL2, and UL3.

Each of the unit layers receives a calculation result of the previous unit layer and calculates and outputs the calculation result. A first unit layer UL1 receives and calculates the output of pre-processing operation (S100) and outputs the calculation result to a second unit layer UL2. The unit layers include convolution layers C1, C2, and C3 for performing a convolution calculation, attention layers Attention1, Attention2, and Attention3, and pooling layers Pool1, Pool2, and Pool3, respectively. The last unit layer outputs the calculation result to a fully connected layer FC.

Each of the convolution blocks C1, C2, and C3 performs a convolution calculation using 512 channels and a 3×3×3 (T×H×W) kernel. A feature map in a pixel unit, which includes time information output from pre-processing operation (S100), is combined into a three-dimensional spatial-temporal feature map through the convolution blocks C1, C2, and C3. That is, a spatial relation between adjacent temporal features is searched from the feature map output from pre-processing operation (S100), thereby expanding a feature space to a space-time region for action recognition. The activation function may be calculated in each of the convolution blocks C1, C2, and C3, and the activation function may be ReLu.

A feature map FM1 output from the convolution block C1 may have a size of 512×10×4×8, a feature map FM2 output from the convolution block C2 may have a size of 512×5×2×6 (512×10×4×8), and a feature map FM3 output from the convolution block C3 may have a size of 512×5×2×6. The size of each feature map is expressed as C×T×H×W.

Figure 8:
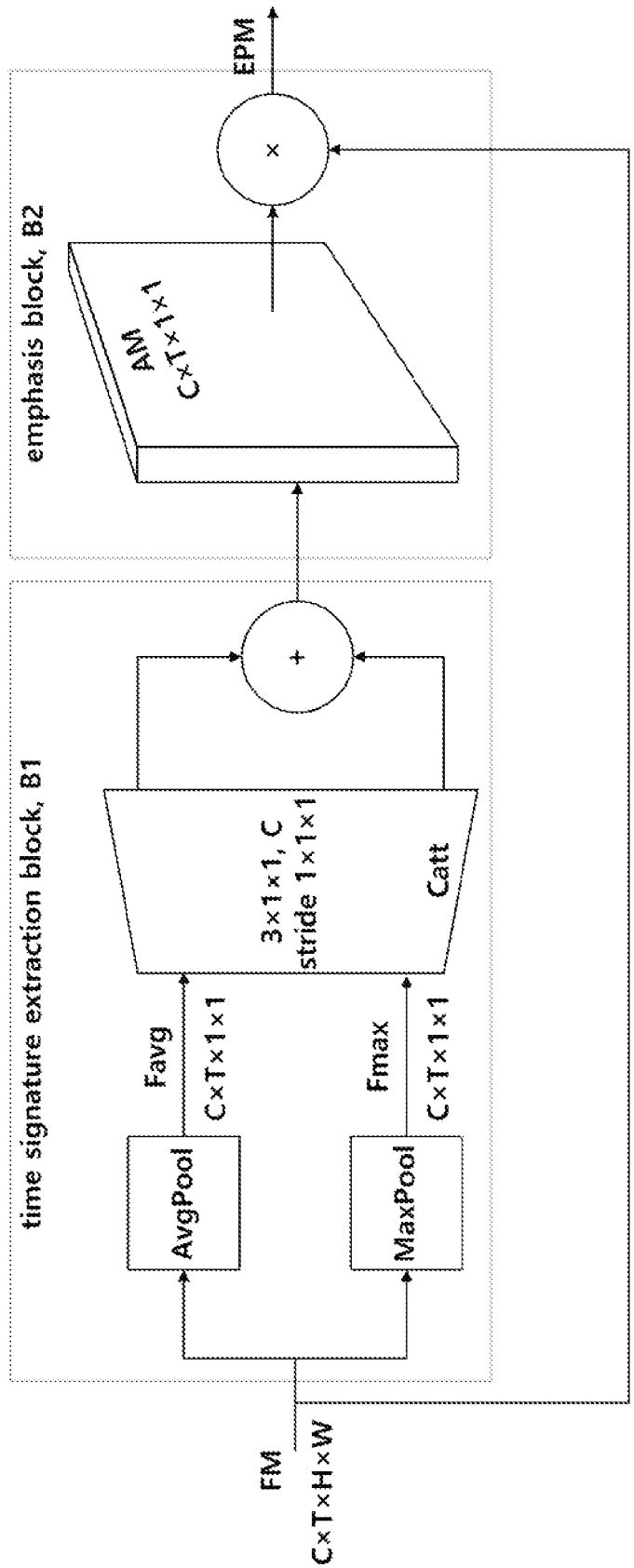
FIG. 8 is a block diagram illustrating an overview of an attention block included in each unit layer.

FIG. 8 is a block diagram illustrating an overview of an attention block included in each unit layer. Referring to FIGS. 7 and 8, the feature maps FM1, FM2, and FM3 output from of the convolution layers C1, C2, and C3 are input to the attention blocks Att1, Att2, and Att3, respectively.

Each of the attention blocks includes a time signature extraction block B1 configured to extract a temporal feature of an action from the input feature map FM, and an emphasis block B2 configured to form an emphasized feature map EFM that is emphasized according to the temporal feature. The attention block forms the emphasized feature map, in which actions having different temporal features may be further distinguished, from the input feature map and outputs the emphasized feature map.

The time signature extraction block B1 includes an average pooling block AvgPool configured to perform average pooling on the feature map FM provided as an input and a maximum pooling block MaxPool configured to perform max pooling on the feature map provided as an input.

The average pooling block outputs an average pooling feature map Favg with a size of C×T×1×1 (C: number of channels, T: number of frames) by performing average pooling with a kernel of 1×1×H×W. Similarly, the maximum pooling block MaxPool outputs a maximum pooling feature map Fmax by performing max pooling with a kernel of 1×1×H×W.

The average pooling feature map Favg and the maximum pooling feature map Fmax are input to an attention convolution block Catt to train the convolution block Catt, and an output formed by inputting the maximum pooling feature map Fmax and the average pooling feature map Favg to the convolution block Catt is summed to form an attention map AM with a size of C×T×1×1.

The feature map FM output from the pre-processing block includes temporal features extracted from a plurality of consecutive frames, and among the temporal features, there is a temporal feature for each operation that affects a final action classification of the object. As an example, there may be an action of the object of sitting down or standing up, and an action taking a relatively long time as compared thereto. That is, a temporal feature, which is a time feature, is different for each of the actions to be distinguished. The time signature extraction block B1 extracts a temporal feature for each action and performs training by recording the extracted temporal feature in the form of a weight in the attention map AM. In the inference process, the emphasized feature map EFM is formed by multiplying the attention map formed as will be described below and the input feature map.

The emphasis block B2 forms the emphasized feature map EFM having a higher value in a specific time zone corresponding to the temporal feature of the action by calculating a product of an element of the input feature map FM and an element of the attention map AM. Accordingly, a higher influence may be affected to the action classification.

Referring to FIG. 7 again, the emphasized feature map EFM, which is the result output from the attention block, is input to the pooling layer. Each pooling layer may perform max pooling, and in another embodiment, each pooling layer may perform average value pooling. Pooling calculation may be performed on each of the pooling layers by performing a stride with a size of 2×1×1 (T×H×W) using a kernel of 2×1×1 (T×H×W). The result of performing the pooling calculation is provided to the fully connected layer FC.

Each of a plurality of unit calculation blocks UL continuously performs a calculation process. As the plurality of unit calculation blocks continuously perform calculations, a feature map in which the temporal feature is further emphasized as compared to the feature map in which the temporal feature is emphasized in the previous process is formed and output. Accordingly, in the final output of the plurality of unit calculation blocks UL, the temporal feature of the target action to be distinguished is emphasized, so that an accuracy may be improved when the target action is distinguished.

The fully connected layer FC is located at the end of inference operation (S200) and performs a calculation, and receives the output of the last unit layer UL3 and classifies the action of the object therefrom.

The present embodiment may further include a process of training the apparatus in order for action recognition. The training process may be performed while updating the weight included in the calculation blocks described above.

A cross entropy loss function $L_{CE}$ is used to train an action recognition network for distinguishing a plurality of target actions. The cross entropy loss function LC E may be used to distinguish between the plurality of target actions belonging to an action class.

However, the action recognition apparatus for performing the action recognition method inevitably encounters actions other than the trained target action in real situations, and thus, in an actual action scenario, the trained target action as well as untrained actions must be distinguished for robustness of operation. That is, an open-set classification scenario is considered.

The network is trained to output a low confidence (i.e., a low softmax probability) across an operation class that is a set of target actions to indicate the untrained actions. Accordingly, a minimum distance between a distribution of the target actions and a distribution of the untrained actions is maximized, and all the target actions have a uniform distance.

How far apart the two distributions are from each other is measured using Kullback-Leibler (KL) divergence. Thus, this loss causes a low confidence to be output for the actions that are not trained for the class of the target action. In order to implement this, a KL divergence loss function $L_{KL}$ is integrated into the loss design, and finally, may be expressed as shown in Equation 1 below, $$L_{Total} = L_{CE} + L_{KL} = -\sum_i y_i \cdot \log\sigma_i(\hat{x}) + D_{KL}(U(y) \| \sigma(\hat{x}'))$$ [Equation 1]

(where, $\hat{X}$: predicted value, y: one-hot encoded label, $\sigma_i$ ( ): softmax probability of i-th action, $\hat{X}'$: predicted value of untrained action, $D_{KL}$: KL divergence, and U ( ): uniform distribution).

As an example, when a target action is input, since an $L_{CE}$ value for a corresponding action in a class is high, but $L_{KL}$ may be ignored, the target action has a high level of confidence value. As another example, for the untrained actions, $L_{CE}$ may be ignored for the target action and $L_{KL}$ has a low value for the actions in the class. Accordingly, training is performed by updating weight values in the block by using these values.

As illustrated herein, $L_{total} = L_{CE} + L_{KL}$. In the present embodiment, output reliability is first compared with a threshold δ when an action prediction is interpreted. The reliability higher than δ is considered a valid classification, and the reliability less than δ is regarded as detecting the untrained action. In the experiment, δ=0.371 is balanced between a classification accuracy (91.82%) of the target action and an identification (99.26%) of the untrained action.

FIG. 9 is a diagram illustrating an overview of the action recognition apparatus 12 configured to perform action recognition according to the present embodiment. Referring to FIG. 9, the action recognition apparatus 12 according to the present embodiment may include an input unit 21, an output unit 22, a processor 25, a memory 24, and a data storage 23. The action recognition apparatus 20 of FIG. 9 is an apparatus according to one embodiment, and all blocks shown in FIG. 9 are not essential components. In another embodiment, some blocks included in the action recognition apparatus 20 may be added, changed, or omitted. Meanwhile, the action recognition apparatus 20 may be implemented as a computing apparatus for performing an action recognition method, and each component included in the action recognition apparatus 20 may be implemented as a separate software device or may be implemented as a separate hardware device in which software is embedded.

The action recognition apparatus 12 performs the action recognition method of the present embodiment including pre-processing operation (S100) of forming a feature map according to a time of each pixel included in a low-resolution image of an object from the input image, and inference operation (S200) of inferring an action of the object from the feature map, and the inference operation includes extracting a temporal feature of a target action and forming an emphasized feature map according to the extracted temporal feature.

The input unit 21 refers to a device configured to receive a low-resolution image from the reader R or the low-resolution imaging apparatus 10. Accordingly, the input unit 21 may receive a low-resolution image by performing the above-described communication with the low-resolution imaging apparatus 10. In addition, the input unit 21 may interwork with the processor 25 to receive various types of signals or data, or may interwork with an external apparatus to directly obtain data and transmit the data to the processor 25. The input unit 21 may be an apparatus or a server for inputting or receiving log information, various condition information, a control signal, or the like, but the present disclosure is not necessarily limited thereto.

The output unit 22 interworks with the processor 25 to display an action recognition process, a recognition result, log information, or the like. In order to output predetermined information, the output unit 22 may display or output various pieces of information through a display (not shown), a speaker, or the like provided in the action recognition apparatus 12, but the present disclosure is not necessarily limited thereto.

The processor 25 performs at least one instruction or program stored in the memory 24. The processor 25 according to the present embodiment calculates data for performing each operation on the basis of data obtained from the input unit 21 or the data storage 23, and detects a failure.

The memory 24 includes at least one instruction or program executable by the processor 25. The memory 24 may fetch and store instructions or programs for performing processes stored in the data storage 23. The memory 24 may store associated values, such as a result, an intermediate value, or the like obtained after performing each operation.

The data storage 23 refers to a general data structure implemented in a storage space (hard disk or memory) of a computer system by using a data storage management program (e.g., a database management system (DBMS)). The data storage 23 may freely perform tasks such as searching (extracting), deleting, editing, and adding data. In one embodiment, the data storage 23 may store instructions compiled to be executed and driven by the processor 25 to perform the action recognition method according to the present embodiment. The memory 24 may fetch corresponding instructions by a request from the processor 25.

The data storage 23 according to the present embodiment may receive and store a low-resolution image and user restriction conditions provided through the input unit 21, and provide the stored data as needed. Meanwhile, the data storage 23 is described as being implemented in the action recognition apparatus 12, but is not necessarily limited thereto, and may be implemented as a separate data storage apparatus.

EXPERIMENTAL EXAMPLE AND EVALUATION

Figure 10A:
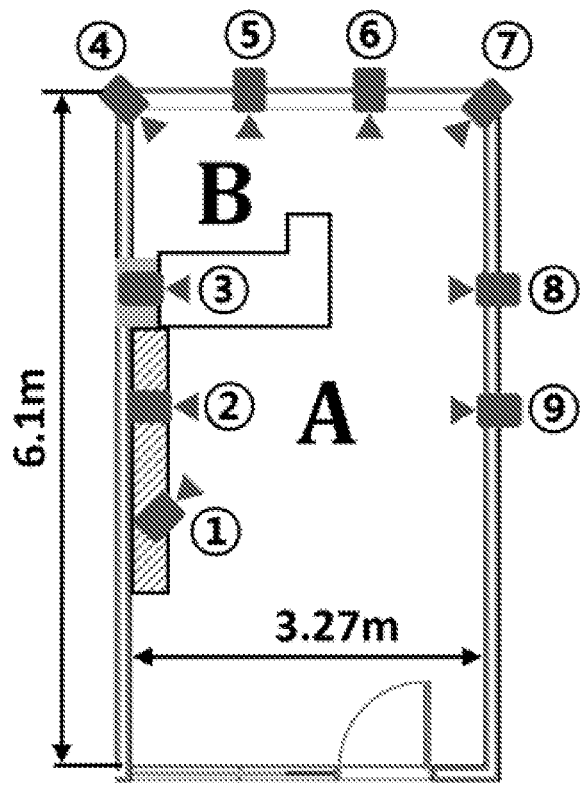
FIGS. 10A and 10B are diagrams respectively illustrating an experimental environment and the arrangement of the low-resolution imaging apparatuses.
Figure 10B:
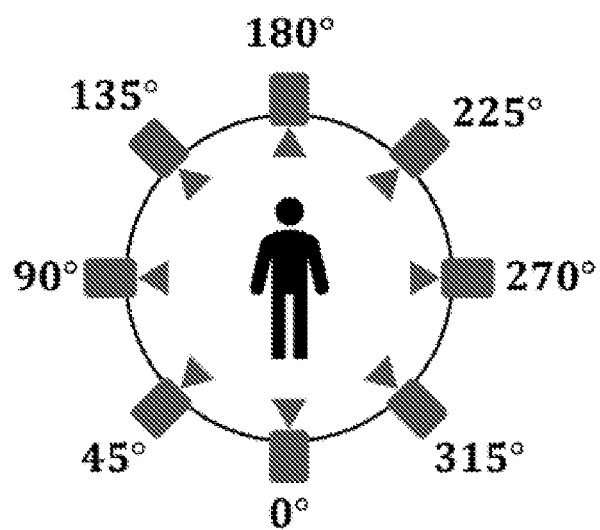

FIGS. 10A and 10B are diagrams respectively illustrating an experimental environment and the arrangement of the low-resolution imaging apparatuses. Referring to FIGS. 10A and 10B, the system according to the present embodiment was verified by assuming an indoor scenario of a single household where it is difficult to inform an emergency situation. As shown in FIG. 10A, the experimental setting was a 6.10 m×3.27 m office space including various objects that could partially or completely hide human actions. The low-resolution imaging apparatuses of the present embodiment were disposed in various positions.

Two positions A and B are exemplified to indicate places in the indoor environment. A is a space where people can move freely, and B is a corner space where people are covered by other obstacles such as desks and monitors. For example, a limited field of view of the low-resolution imaging apparatus disposed in ② makes a movement occurring at B undetectable. The following experiments were performed in the above-described environment.

Action Class

The action recognition apparatus and the action recognition method of the present embodiment are demonstrated with a target action class that is to be distinguished and consisting of 10 actions. A total of 10 target actions to be distinguished are defined based on i) statistics of time spent on major activities (i.e., based on U.S. Bureau of Labor Statistics data) and ii) common examples of preventable injuries in the home (e.g. poisoning, falls, and suffocation) reported by the US National Safety Council as top 3 injuries.

In consideration of both statistics, ten target actions of a clean-up action, a sit-down action, a stand-up action, an exercise action, a drink action, staggering, falling down, back pain, a walk-around action, and a sneeze action were defined.

Data Set Collection

A low-resolution video was collected for each defined target action using the same low-resolution camera attached to the low-resolution imaging apparatus of the present embodiment. Accordingly, the action recognition apparatus including a trained neural network may directly access the video recorded by the low-resolution imaging apparatus disposed in the end-to-end scenario. As illustrated in FIG. 10, nine low-resolution imaging apparatuses were used to collect the entire data, and unless otherwise specified, three low-resolution imaging apparatuses ①, ④, and ⑦ were used to evaluate the performance of the present embodiment. In order to avoid unexpected bias between low-resolution images, the evaluation was performed on seven people of different heights (from 169 cm to 184 cm) and different weights (from 64 kg to 96 kg).

In order to cover various situations occurring in any direction, all actions were recorded in eight directions where the person additionally rotated 45 degrees, starting from the front, where the person gazes directly into a camera lens. A total of 17,280 moving pictures having a length of 5 seconds was recorded according to the above specification, and 1,728 samples were provided per distinguished target action.

Network Training and Evaluation

The neural network of the action recognition apparatus was trained with the low-resolution images collected above. The input to the network was a 5-second length video in which a spatial dimension is 6×10 (H×W) and which is presented in a single channel. Network performance according to the present embodiment was actually tested by randomly selected direction data in consideration that the human moves in an arbitrary direction. In order to verify the performance, all results related to the action recognition were recorded through triple cross-validation (the whole data set is split into 3, 2 splits for training network and the remaining 1 split for testing). All the experiments were performed in an Nvidia RTX 2080 Ti GPU equipped with 11 GB RAM.

End-to-End Evaluation

An end-to-end evaluation was performed to demonstrate the practicality of the present embodiment. The evaluation consists of i) received signal strength indicator (RSSI) filtering for movement detection, and ii) action recognition using the low-resolution imaging apparatus.

Detection through RSSI

RSSI changes were continuously observed in the low-resolution imaging apparatus by using short ACK messages through the reader. The RSSI indicates a relative strength of the received signal, and a value thereof varies with a channel change (e.g., an obstacle in a field of view of the RFID antenna with respect to the low-resolution imaging apparatus). An RSSI variance may be observed through this, thereby detecting a movement in the periphery of the low-resolution imaging apparatus. That is, when the RSSI variance is measured to be greater than an RSSI threshold, the low-resolution imaging apparatus is switched to a detection state. The RSSI threshold is analytically set to 0.93, which is 25% higher than the maximum RSSI variance (=0.74), when there is no movement. Whenever a movement is detected by the low-resolution imaging apparatus, all the low-resolution imaging apparatuses are changed to a wake-up state. In the evaluation, three low-resolution imaging apparatuses and a reader were disposed in the same space in order to detect a movement. In order to detect a movement, the low-resolution imaging apparatus monitors the RSSI variance with a sliding window of 0.2 seconds long and an operation size of 0.02 seconds. Four persons have recorded a total of 100 entry movements, and the low-resolution imaging apparatus has detected the movement in 99% within 1.32 seconds.

Action Recognition Performance

When the low-resolution imaging apparatus operates, all the low-resolution imaging apparatuses in the room start video recording. Overall action recognition performance of the present embodiment was evaluated through a majority voting mechanism in three low-resolution imaging apparatuses. In a tie determination, the most convincing deduction will be chosen as a final decision. Through this strategy, the present embodiment achieved an average accuracy of 98.16% in the experimental environment (5 seconds of moving pictures at 2 frames per second).

FIGS. 11A and 11B are diagrams illustrating performance obtained in different fields of view with the single low-resolution imaging apparatus in each of positions A and B, in the form of a confusion matrix, and FIG. 11C is a diagram illustrating classification results, which are obtained from both positions A and B, in the form of a confusion matrix. An overall accuracy (86.04%) in B is lower than that (93.19%) in A due to various obstacles (e.g., desks and monitors) that interfere with the action when evaluating the performance with the single low-resolution imaging apparatus. Even in the case of identifying 10 target actions using three low-resolution imaging apparatuses, a promising result was obtained in which a classification accuracy of 98.16% is achieved.

Encountering actions other than the 10 target actions is unavoidable in real life scenarios. By adding five additional actions and showing that actions other than the target actions and the target actions can be distinguished, it is proved that the system according to the present embodiment works in real life.

Based on data from the US Bureau of Labor Statistics, five additional actions of (11) standing still, (12) working, (13) looking at the phone, (14) stretching, and (15) grooming, which are commonly occurring in daily life, were defined. In order to evaluate this scenario, two types of networks were trained, which are i) the network trained only with the 10 target actions defined above and ii) the network trained with all of the 10 target actions and five untrained actions. The latter network was trained with loss of $L_{total}=L_{CE}+L_{KL}$, which effectively distinguishes both distributions.

Figure 12A:
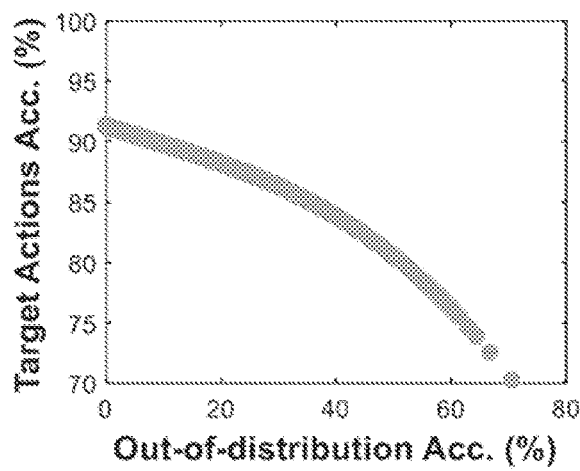
FIG. 12A and FIG. 12B are diagrams illustrating a trade-off between classifications of the target actions and the untrained actions.
Figure 12B:
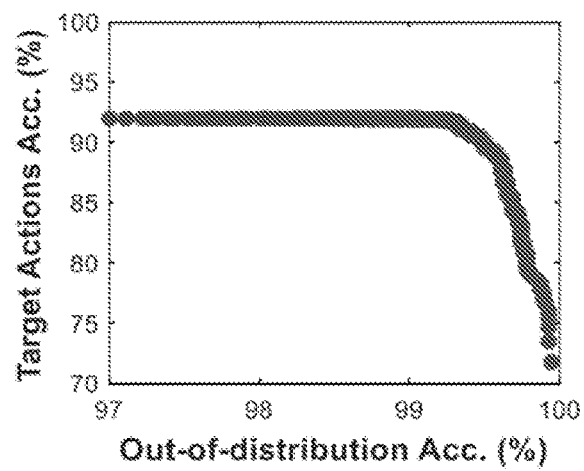

FIG. 12A and FIG. 12B are diagrams illustrating a trade-off between classifications of the target actions and the untrained actions, and illustrates the performance of the present embodiment of classifying the target actions while identifying the untrained actions. An X-axis of two graphs is a probability that the untrained action is classified as the trained action, and a Y-axis thereof is an accuracy of classification of 10 target actions. A confidence threshold δ was changed from 0.000 to 0.999 and the results were plotted. Out-of-distribution accuracies of networks trained without and with KL loss periods were 8.80% and 99.48% respectively, and 90% classification accuracy was achieved on the 10 target actions. The thresholds corresponding to those accuracies are δ=0.596 and =0.620, respectively. When comparing the results, it may be confirmed that the network trained with $L_{total}$ has a great ability to distinguish between an invisible action and the action of the object.

Performance According to Arrangement Angle of Low-Resolution Imaging Apparatus

FIG. 10A illustrates nine low-resolution imaging apparatuses of the present embodiment disposed on three different walls and three corners, which cover the entire space. A relative angular difference between directions of the human and the low-resolution imaging apparatus is defined. For example, when a person is facing a door in FIG. 10A, a relative angle at which a low-resolution imaging apparatus 1 viewed the person is 45°.

Figure 13A:
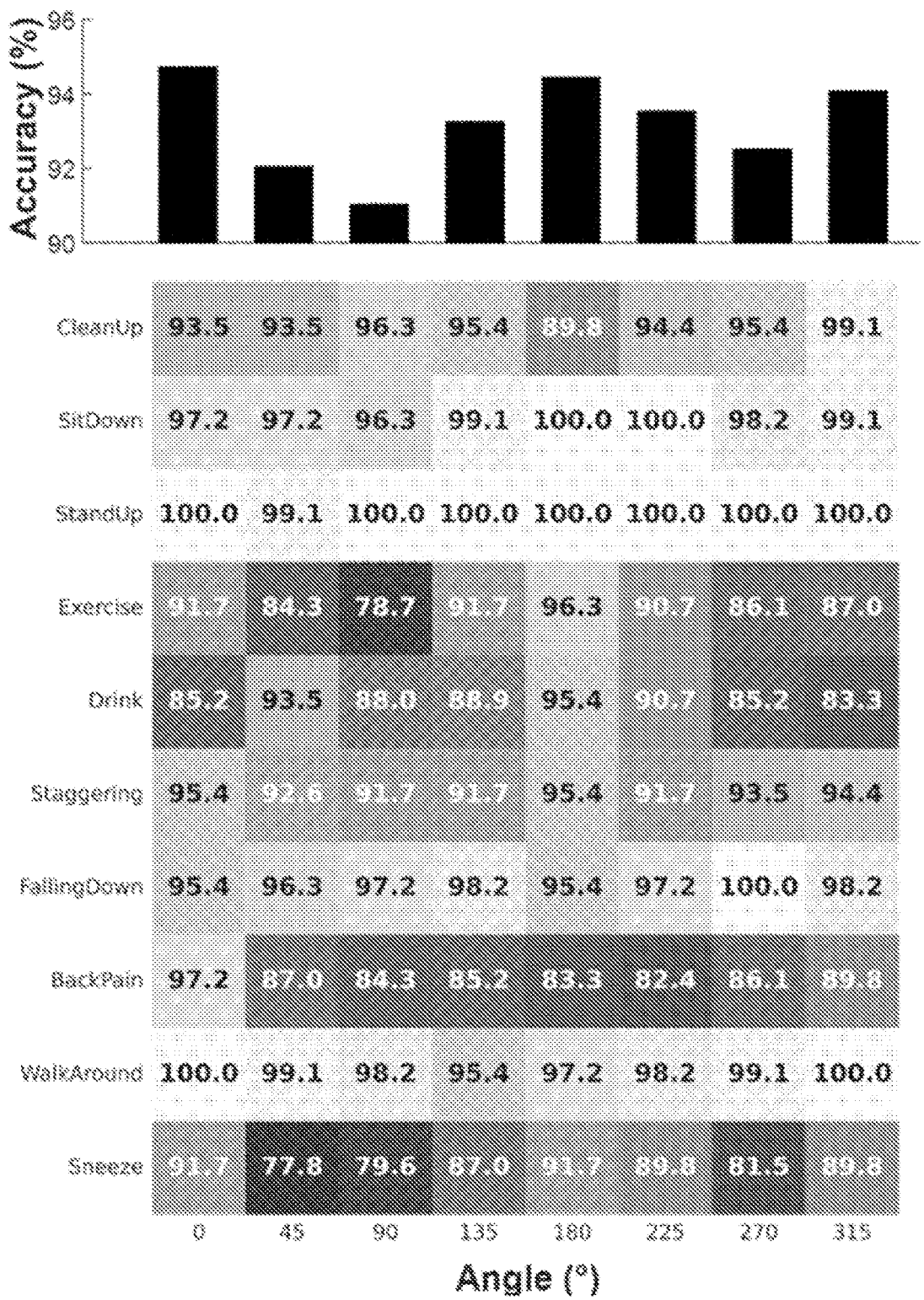
FIG. 13A and FIG. 13B are diagrams illustrating an accuracy of each action viewed at different relative angles.
Figure 13B:
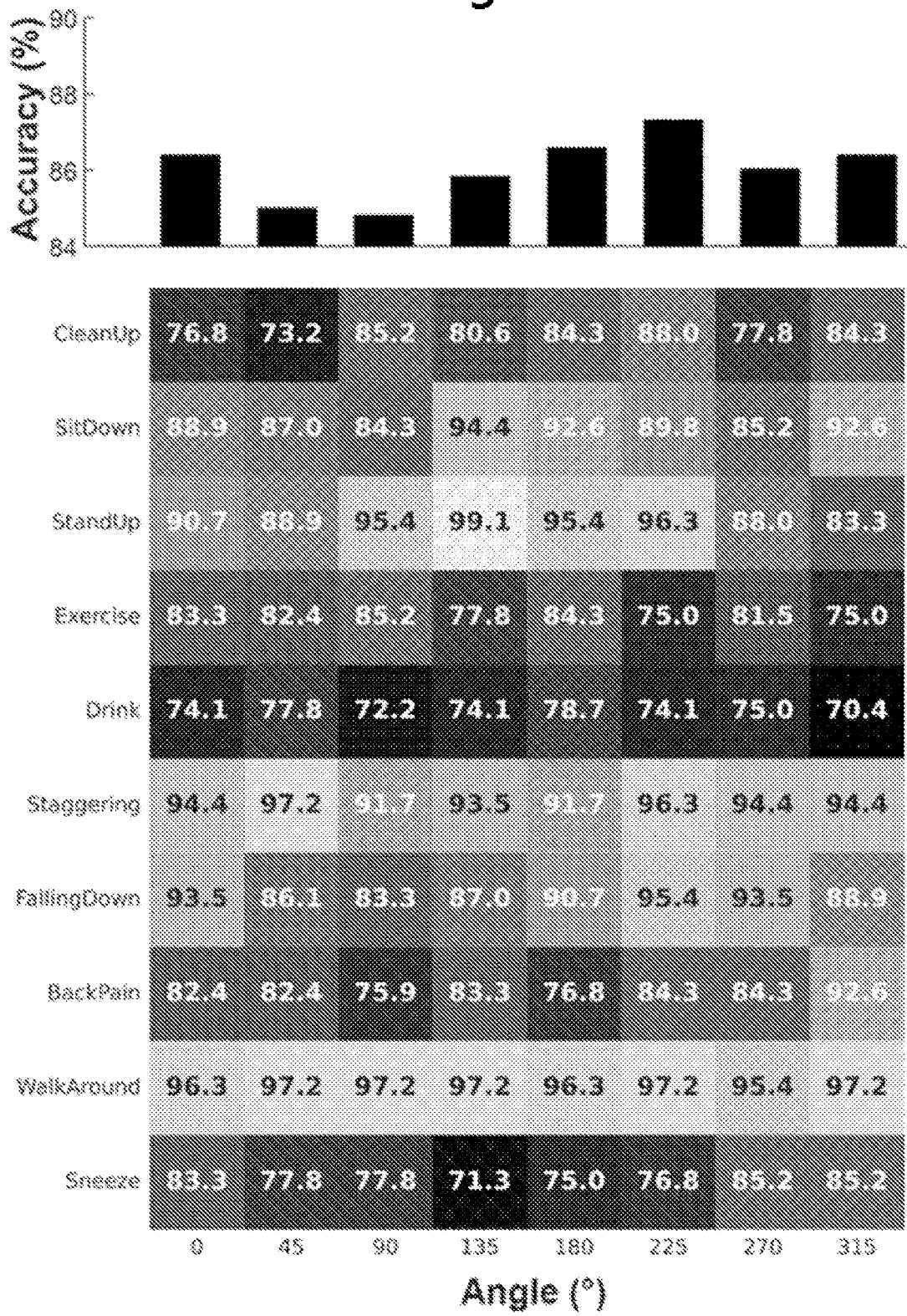

The accuracy of each action viewed at different relative angles is illustrated in FIG. 13A and FIG. 13B. The accuracies of some asymmetric actions, such as exercise, drinking water, and sneezing, are varied depending on the relative angle. Specifically, the accuracy of the exercise action at position A is between 78.70% (90°) and 96.30% (180°), and there is a difference of 17.59% between the relative angles. This means that the single low-resolution imaging apparatus is limited in covering the entire space due to limited viewpoint diversity.

Multiple Low-Resolution Imaging Apparatuses Arrangement

When a plurality of low-resolution imaging apparatuses are disposed at different walls and corners, the viewpoint diversity is added to the system, thereby improving performance for the different action directions. Improving the viewpoint diversity also helps in ensuring that a task being done in multiple positions, in which high accuracy cannot be achieved with the single low-resolution imaging apparatus of the present embodiment, is better captured (see FIG. 13B). The accuracy with respect to the number of low-resolution imaging apparatuses included in the action recognition task was calculated to demonstrate the effectiveness of the distribution of the multiple low-resolution imaging apparatuses. In particular, all combinations of the low-resolution imaging apparatuses were attempted, and in case of a tie, a majority voting mechanism is used on the reliability scores to determine the average.

Figure 14:
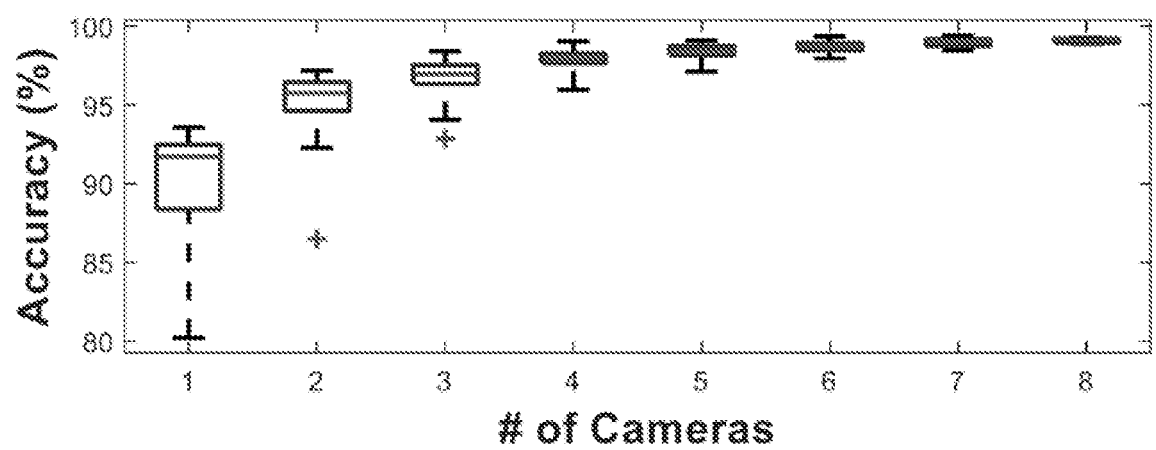
FIG. 14 is a diagram illustrating the average accuracy of low-resolution imaging apparatus combinations at positions A and B with respect to the number of low-resolution imaging apparatuses.

FIG. 14 illustrates the average accuracy of low-resolution imaging apparatus combinations at positions A and B with respect to the number of low-resolution imaging apparatuses. The distribution of the multiple low-resolution imaging apparatuses is particularly effective as compared with the single low-resolution imaging apparatus. Examples of six out of seven successful combinations that result in 98% or more accuracy on three low-resolution imaging apparatuses will be described. All the low-resolution imaging apparatuses of combinations of ((①, ③, ⑦), (①, ③, ⑧), (①, ④, ⑦), (③, ⑦, ⑨), (①, ④, ⑧), and (①, ⑦, ⑨)) were combined to be disposed on different walls and corners, which shows a beneficial effect on the viewpoint diversity. In general, in the case of environmental factors such as blockage by furniture, at least three or four low-resolution imaging apparatuses may be disposed on the walls and corners in order to obtain benefits for the various points of view. In the present embodiment, in which at least 11 low-resolution imaging apparatuses are available, a high accuracy greater than 99.32% may be achieved. In the present embodiment, an average accuracy of 98.43% is still achieved in the case of harsh environments, and it is assumed that half of the low-resolution imaging apparatuses may only be used to provide viewpoint diversity.

Effect of Frame Rate

Figure 15:
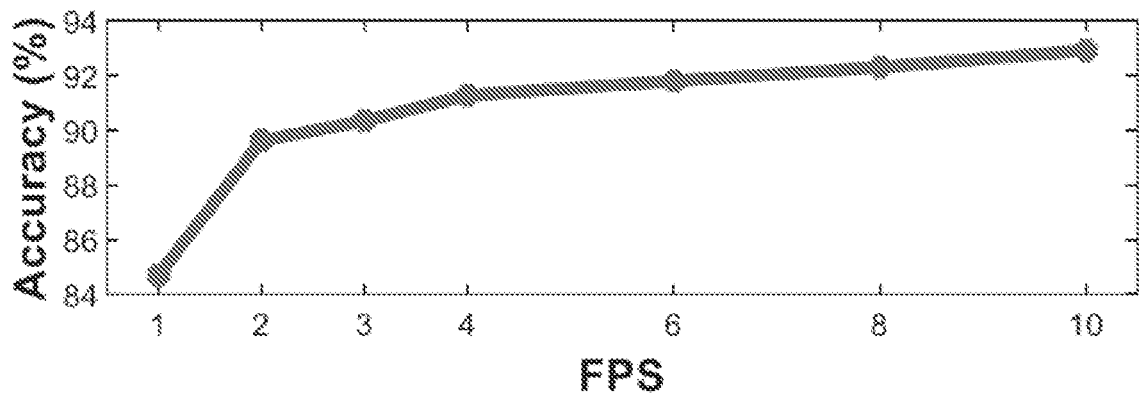
FIG. 15 is a diagram illustrating an accuracy gain according to an increase in a frame rate of an input video.

In this experiment, the effect of a frame rate fps on the accuracy of the network according to the present embodiment was evaluated. Additional networks allowing videos at different frame rates while maintaining the structure and operation described above were constructed and trained. FIG. 15 illustrates an accuracy gain according to an increase in a frame rate of an input video. It can be seen that performance is reduced when a frame rate per second is lower than two frames per second in addition to the fact that performance improvement in a region having a frame rate higher than two frames per second is relatively small, since the frame rate of two frames per second is used in the present embodiment. In the present embodiment, three low-resolution imaging apparatuses achieve 98.49% accuracy with a 4 fps video, but when videos with a higher frame rate (e.g., higher luminance environment) are used in the low-resolution imaging apparatus, the performance can be further improved.

Performance in Energy Harvesting Environment

Figure 16:
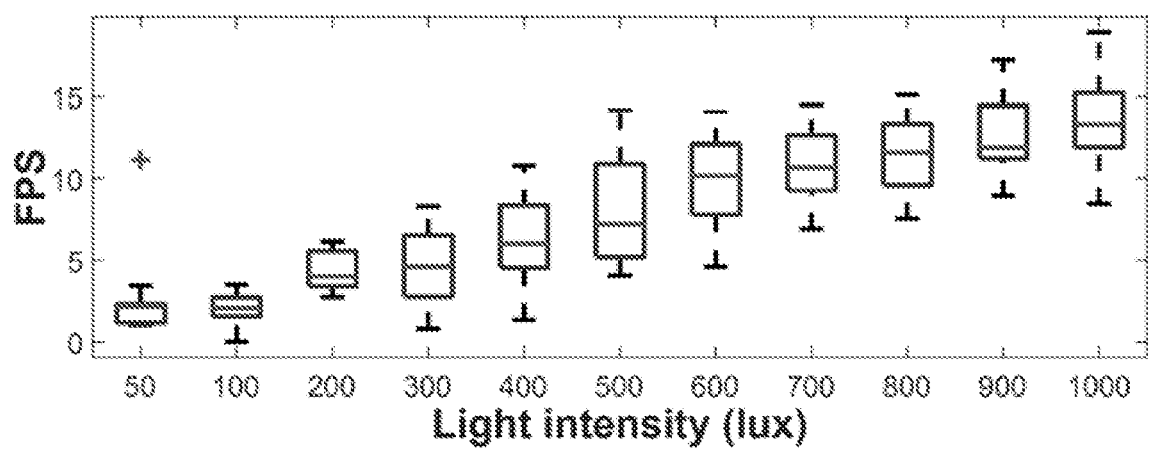
FIG. 16 is a diagram illustrating a positive correlation between the frame rate and surrounding lighting.

A correlation between a lighting condition and a frame rate in the low-resolution imaging apparatus was evaluated with the low-resolution imaging apparatus of the present embodiment. 19 samples were measured for all lighting conditions. As shown in FIG. 16, the frame rate has a positive correlation with surrounding lighting that is fluctuated due to measurement errors of an illuminometer. It can be seen that the low-resolution imaging apparatus of the present embodiment may achieve 2 fps even in a dark room environment of 50 lux. In addition, since a lighting dimmer needs to be disposed and more temporal feature need to be obtained for higher accuracy, more cells may be collectively processed as necessary to increase the frame rate.

Operation in Dark State

In the present embodiment, invisible light, such as near-infrared light, is detected to form a low-resolution image. Another unique benefit of using invisible light sensors is in a 24-hour operation. As an example, since near-infrared spectrums are not visible to the human eye, a near-infrared spectrum detection may operate in a non-destructive manner so that recording can be made while mostly maintaining of the properties of a low-resolution video recorded in high-illumination environments.

Figure 17A:
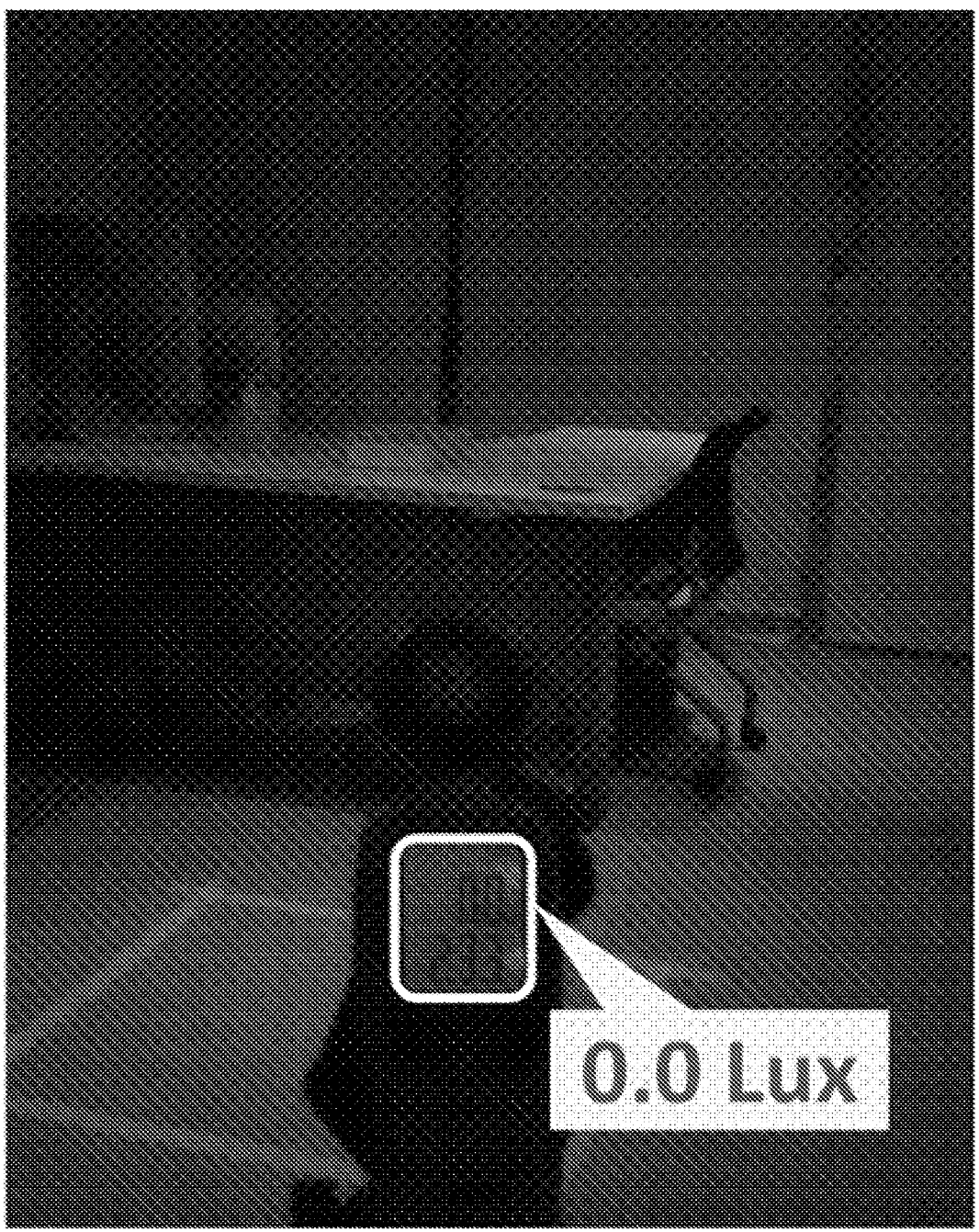
FIG. 17A is a diagram illustrating a new lighting condition environment which is a dark environment.

In order to confirm that the present embodiment works under various lighting conditions, the network of the present embodiment was evaluated without performing additional training on a new lighting condition in a dark environment of 0.0 Lux illustrated in FIG. 17A. FIG. 17B illustrates that an action classification accuracy of 87.75% was achieved even without training the present embodiment with the video recorded under such a lighting condition. While there is a 10.41% p drop in performance on the network where the test was performed in a brighter room, the results indicate that the present embodiment can still be used to detect gestures in the dark place.

In order to help understanding the present disclosure, the present disclosure has been described with reference to the embodiment shown in the drawings, but it will be understood that this is merely exemplary, and those of ordinary skill in the art will understand that various modifications and variations of the embodiments are possible therefrom. Accordingly, the true technical protection scope of the present disclosure should be defined by the appended claims.

What is claimed is:

1. A low-resolution imaging apparatus configured to form and transmit a low-resolution image of an object, the low-resolution imaging apparatus comprising:
a low-resolution camera configured to form the low-resolution image of the object;
a microcontroller including an analog-to-digital convertor (ADC) that converts the low-resolution image into a digital image;
an energy harvesting module configured to provide power to the low-resolution camera and the microcontroller; and
a radio frequency identification (RFID) unit configured to transmit the digital-converted low-resolution image,
wherein the RFID unit is configured to transmit the digital-converted low-resolution image to an external apparatus, and
the external apparatus is configured to
extract pixel values of pixels at the same position in two consecutive frames of the image formed by the low-resolution camera,
calculate an average of the pixel values of the pixels, in which a difference between the extracted pixel values is greater than a threshold value,
calculate a set value of the low-resolution camera to correspond to the calculated average of the pixel values, and
transmit the set value of the low-resolution camera to the low-resolution imaging apparatus.

2. The low-resolution imaging apparatus of claim 1, wherein the low-resolution image is a gray-scale image having a frame rate of 10 frames per second or less, and has a resolution in which a spatial feature of the object is not visually distinguished.

3. The low-resolution imaging apparatus of claim 1, wherein the microcontroller controls the energy harvesting module and the low-resolution camera.

4. The low-resolution imaging apparatus of claim 1, wherein the low-resolution camera captures an image of the object with invisible light and forms the low-resolution image.

5. The low-resolution imaging apparatus of claim 1, wherein the external apparatus further calculates the set value so that the calculated average of the pixel values corresponds to a median of an input dynamic range of the ADC.

6. The low-resolution imaging apparatus of claim 1, wherein the microcontroller extracts pixel values of pixels at the same position in two consecutive frames of the low-resolution image formed by the low-resolution camera, and calibrates the low-resolution image by adjusting exposure of the pixels in which a difference between the extracted pixel values is greater than a threshold value.

7. The low-resolution imaging apparatus of claim 6, wherein the microcontroller includes the ADC, and
the microcontroller calculates an average of the pixel values extracted from the two consecutive frames, and further adjusts the pixel values so that the calculated average of the pixel values corresponds to an input dynamic range of the ADC.

8. The low-resolution imaging apparatus of claim 6, wherein the RFID unit includes:
an RFID circuit;
an antenna configured to transmit the low-resolution image calibrated by the microcontroller; and
an RF energy harvesting unit, and
the RFID unit is driven by power collected by the RF energy harvesting unit.

9. The low-resolution imaging apparatus of claim 8, wherein the RFID circuit performs sub-carrier modulation using a Miller 8 modulation method.

10. An action recognition method comprising:
a pre-processing operation of obtaining a feature map according to a time of each pixel included in a low-resolution image of a plurality of frames of an object from the input low-resolution image; and
an inference operation of inferring a target action of the object from the feature map, wherein the inference operation is performed by extracting a temporal feature of the target action and forming an emphasized feature map according to the extracted temporal feature.

11. The action recognition method of claim 10, wherein the input low-resolution image has a frame rate of 10 frames per second or less and a resolution in which a spatial feature of the object is not visually distinguished.

12. The action recognition method of claim 10, wherein, in the pre-processing operation, the feature map corresponding to the temporal feature is formed from the input low-resolution image of the plurality of frames of the object.

13. The action recognition method of claim 10, wherein the pre-processing operation is performed by performing a convolution calculation using a time corresponding to the number of frames and a kernel formed in a number smaller than the number of pixels included in the frame.

14. The action recognition method of claim 10, wherein the inference operation includes a unit calculation operation including a convolution calculation operation, an attention calculation operation, and a pooling operation,
wherein the attention calculation operation includes extracting the temporal feature of the target action from an input feature map (FM), and forming an emphasized feature map (EFM) according to the extracted temporal feature.

15. The action recognition method of claim 14, wherein the inference operation includes a plurality of unit calculation operations that are continuously performed, and
as the plurality of unit calculation operations are continuously performed, a feature map in which the temporal feature is further emphasized as compared to the emphasized feature map output from the previous operation is output.

16. The action recognition method of claim 10, wherein the extracting of the temporal feature of the target action includes:
performing average pooling on the input feature map;
performing max pooling on the input feature map;
summing results obtained by performing the average pooling and the max pooling; and
forming an attention map corresponding to the temporal feature of the target action by using the summed result.

17. The action recognition method of claim 10, wherein the forming of the emphasized feature map according to the extracted temporal feature is performed by calculating an element-to-element multiplication of the input feature map and an attention map.

18. The action recognition method of claim 10, wherein each of a clean-up action, a sit-down action, a stand-up action, an exercise action, a drink action, staggering, falling down, back pain, a walk-around action, a sneeze action, and other actions of the object is distinguished.

19. The action recognition method of claim 10, further comprising a training operation performed before the pre-processing operation,
wherein the training operation is performed using a sum of a cross entropy loss function and a Kullback-Leibler divergence loss function.

20. An action recognition apparatus configured to recognize an action of an object, the action recognition apparatus comprising:
one or more processors; and
a memory configured to store one or more instructions executed by the processor,
wherein the instructions, when executed by the one or more processors, cause the one or more processors to perform an action recognition method including:
a pre-processing operation of obtaining a feature map according to a time of each pixel included in a low-resolution image of a plurality of frames of an object from the input low-resolution image; and
an inference operation of inferring a target action of the object from the feature map,
wherein the inference operation is performed by extracting a temporal feature of the target action and forming an emphasized feature map according to the extracted temporal feature.

21. An action recognition system comprising:
a low-resolution imaging apparatus including a low-resolution camera configured to form a low-resolution image of an object and configured to transmit the low-resolution image; and
an action recognition apparatus configured to perform an action recognition method of obtaining a feature map according to a time of each pixel included in the image from the low-resolution image transmitted by the low-resolution imaging apparatus, and inferring an action of the object from the feature map to identify the action of the object,
wherein the low-resolution image has a resolution in which a spatial feature of the object is not visually distinguished.

* * * * *